(12) United States Patent
Kanai et al.

(10) Patent No.: US 9,199,188 B2
(45) Date of Patent: Dec. 1, 2015

(54) METHOD OF MANUFACTURING HONEYCOMB STRUCTURED BODY

(71) Applicant: IBIDEN CO., LTD., Ogaki-shi (JP)

(72) Inventors: Masanori Kanai, Ibi-gun (JP); Yuu Yamakawa, Ibi-gun (JP); Masaya Sato, Ibi-gun (JP)

(73) Assignee: IBIDEN CO., LTD., Ogaki-shi (JP)

( * ) Notice: Subject to any disclaimer, the term of this patent is extended or adjusted under 35 U.S.C. 154(b) by 0 days.

(21) Appl. No.: 14/459,317

(22) Filed: Aug. 14, 2014

(65) Prior Publication Data

US 2014/0352870 A1  Dec. 4, 2014

Related U.S. Application Data

(63) Continuation of application No. PCT/JP2012/053722, filed on Feb. 16, 2012.

(51) Int. Cl.
*B01D 46/00* (2006.01)
*B32B 3/12* (2006.01)
(Continued)

(52) U.S. Cl.
CPC ............ *B01D 46/0001* (2013.01); *B01D 46/00* (2013.01); *B01D 46/247* (2013.01); *B01D 46/2474* (2013.01); *B28B 1/002* (2013.01); *B28B 1/08* (2013.01); *B32B 3/12* (2013.01); *B32B 37/02* (2013.01); *B32B 37/10* (2013.01); *B32B 37/12* (2013.01); *B32B 37/1284* (2013.01); *B32B 37/14* (2013.01); *B32B 37/146* (2013.01); *B32B 37/18* (2013.01); *B32B 38/00* (2013.01); *B32B 38/0004* (2013.01); *B32B 38/0012* (2013.01); *C04B 28/24* (2013.01); *C04B 37/005* (2013.01); *C04B 38/0019* (2013.01); *B01D 46/001* (2013.01); *B01D 46/24* (2013.01); *B01D 2046/2481* (2013.01); *B32B 2305/024* (2013.01); *B32B 2305/80* (2013.01); (Continued)

(58) Field of Classification Search
CPC .... B01D 46/00; B01D 46/001; B01D 46/247; B01D 46/2474; B01D 46/24; B32B 37/00; B32B 37/02; B32B 37/12; B32B 37/14; B32B 37/18; B32B 37/1284; B32B 37/146; B32B 38/00; B32B 38/0004; B32B 38/0012; B32B 3/12; B32B 2305/024; B28B 1/002; B28B 1/08; C04B 28/24; C04B 38/0019; B04B 37/005
See application file for complete search history.

(56) References Cited

FOREIGN PATENT DOCUMENTS

| EP | 1977808 | 10/2008 |
|---|---|---|
| EP | 2147905 | 1/2010 |

(Continued)

*Primary Examiner* — Michael N Orlando
*Assistant Examiner* — Matthew Hoover
(74) *Attorney, Agent, or Firm* — Mori & Ward, LLP

(57) ABSTRACT

In a method of manufacturing a honeycomb structured body, a ceramic block is formed by binding multiple pillar-shaped honeycomb fired bodies with adhesive layers interposed therebetween. The multiple pillar-shaped honeycomb fired bodies are bound on a support by piling up the multiple pillar-shaped honeycomb fired bodies successively. A placing position where a primary honeycomb fired body is to be placed is determined. A position of an end face of at least one secondary honeycomb fired body is fixed by applying force to the end face of the at least one secondary honeycomb fired body. The primary honeycomb fired body is placed on the placing position with the position of the end face of the at least one secondary honeycomb fired body being fixed. The fixing further includes first positioning or second positioning based on a number of the at least one secondary honeycomb fired body before the fixing.

20 Claims, 15 Drawing Sheets

(51) Int. Cl.
- *B32B 38/00* (2006.01)
- *B32B 37/12* (2006.01)
- *B32B 37/14* (2006.01)
- *B28B 1/00* (2006.01)
- *C04B 37/00* (2006.01)
- *C04B 28/24* (2006.01)
- *C04B 38/00* (2006.01)
- *B32B 37/02* (2006.01)
- *B32B 37/10* (2006.01)
- *B32B 37/18* (2006.01)
- *B28B 1/08* (2006.01)
- *B01D 46/24* (2006.01)
- *C04B 111/00* (2006.01)

(52) U.S. Cl.
CPC ....... *B32B 2307/732* (2013.01); *B32B 2315/02* (2013.01); *B32B 2605/00* (2013.01); *C04B 2111/00793* (2013.01); *C04B 2237/08* (2013.01); *C04B 2237/083* (2013.01); *C04B 2237/09* (2013.01); *C04B 2237/341* (2013.01); *C04B 2237/346* (2013.01); *C04B 2237/361* (2013.01); *C04B 2237/365* (2013.01); *C04B 2237/366* (2013.01); *C04B 2237/368* (2013.01); *Y10T 156/1052* (2015.01)

(56) References Cited

FOREIGN PATENT DOCUMENTS

| | | |
|---|---|---|
| EP | 2177493 | 4/2010 |
| EP | 2388057 | 11/2011 |
| JP | 2000-007455 | 1/2000 |
| WO | WO 2008/140095 | 11/2008 |
| WO | WO 2009/019927 | 2/2009 |
| WO | WO 2011/121712 | 10/2011 |

A-A line cross-sectional view

METHOD OF MANUFACTURING HONEYCOMB STRUCTURED BODY

CROSS-REFERENCE TO RELATED APPLICATIONS

The present application is a continuation application of International Application No. PCT/JP2012/053722, filed Feb. 16, 2012. The contents of this application are incorporated herein by reference in their entirety.

BACKGROUND OF THE INVENTION

1. Field of the Invention

The present invention relates to a method of manufacturing a honeycomb structured body.

2. Discussion of the Background

Exhaust gas discharged from internal combustion engines of vehicles, such as buses and trucks, construction machinery, and the like contains particulate matter (hereinafter, also referred to as PM), such as soot, and other harmful substances. The harmfulness of such PM and harmful substances to the environment and the human body is becoming an issue. This issue leads to development of various porous-ceramic honeycomb structured bodies as diesel particulate filters (hereinafter, also simply referred to as DPF) capable of capturing PM in exhaust gas and purifying the exhaust gas.

An aggregated honeycomb structured body is proposed as one honeycomb structured body used as a DPF. Such an aggregated honeycomb structured body includes combination of multiple pillar-shaped honeycomb fired bodies each having many cells longitudinally disposed in parallel with each other. For the aggregated honeycomb structured body, each honeycomb fired body has adhesive layers on the side faces thereof. The honeycomb fired bodies are bonded to each other with the adhesive layers interposed therebetween, thereby providing a honeycomb structured body having a desired size.

JP 2000-7455 A discloses one exemplary method of combining honeycomb fired bodies in the procedure of manufacturing an aggregated honeycomb structured body. The method disclosed in JP 2000-7455 A includes joining honeycomb fired bodies using a support jig for supporting multiple honeycomb fired bodies with adhesive material paste being applied to the respective joint faces between the honeycomb fired bodies (ceramic structured bodies). The literature further discloses that in joining honeycomb fired bodies, a pressing force and vibration are applied to the honeycomb fired bodies supported with the adhesive material paste interposed therebetween so that the adhesive material paste is evenly spread between the honeycomb fired bodies.

WO 2008/140095 A1 discloses a method of manufacturing a honeycomb-segment-joint body including joining multiple honeycomb segments to each other. The method disclosed in WO 2008/140095 A1 includes pressing at least part of the placed honeycomb segment to be kept on a predetermined position so as not to allow the placed honeycomb segment to displace.

Specifically, the literature discloses pressing of a side face of the placed honeycomb segment (a face of the honeycomb segment where cells are not open).

Recently tightened regulations on exhaust gas increase a demand for large honeycomb structured bodies for large-sized vehicles such as trucks and large-sized construction machinery.

SUMMARY OF THE INVENTION

According to one aspect of the present invention, in a method of manufacturing a honeycomb structured body, a ceramic block is formed by binding multiple pillar-shaped honeycomb fired bodies with adhesive layers interposed therebetween. The multiple pillar-shaped honeycomb fired bodies each have cells longitudinally disposed in parallel with each other and cell walls between the cells. Each cell wall of the multiple pillar-shaped honeycomb fired bodies has a thickness of about 0.1 mm to about 0.2 mm and each peripheral wall of the multiple pillar-shaped honeycomb fired bodies has a thickness of about 0.25 mm to about 0.5 mm. In the forming the ceramic block, the multiple pillar-shaped honeycomb fired bodies are bound on a support by piling up the multiple pillar-shaped honeycomb fired bodies successively. In the binding, a placing position where a primary honeycomb fired body is to be placed is determined. A position of an end face of at least one secondary honeycomb fired body is fixed by applying force to the end face of the at least one secondary honeycomb fired body. The at least one secondary honeycomb fired body is a honeycomb fired body whose side face is to be opposite to a side face of the primary honeycomb fired body below the placing position. The primary honeycomb fired body is placed on the placing position with the position of the end face of the at least one secondary honeycomb fired body being fixed. The fixing further includes first positioning or second positioning based on a number of the at least one secondary honeycomb fired body before the fixing. The at least one secondary honeycomb fired body is each placed on a position where a side face of the at least one secondary honeycomb fired body is opposite to a side face of the primary honeycomb fired body to be placed. When the at least one secondary honeycomb fired body includes one secondary honeycomb fired body, the first positioning is performed to fix a position of an end face of only the single secondary honeycomb fired body, or when the at least one secondary honeycomb fired body includes multiple secondary honeycomb fired bodies, the second positioning is performed to fix positions of first end faces of only the multiple secondary honeycomb fired bodies so as to align the positions of the first end faces of the multiple secondary honeycomb fired bodies.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
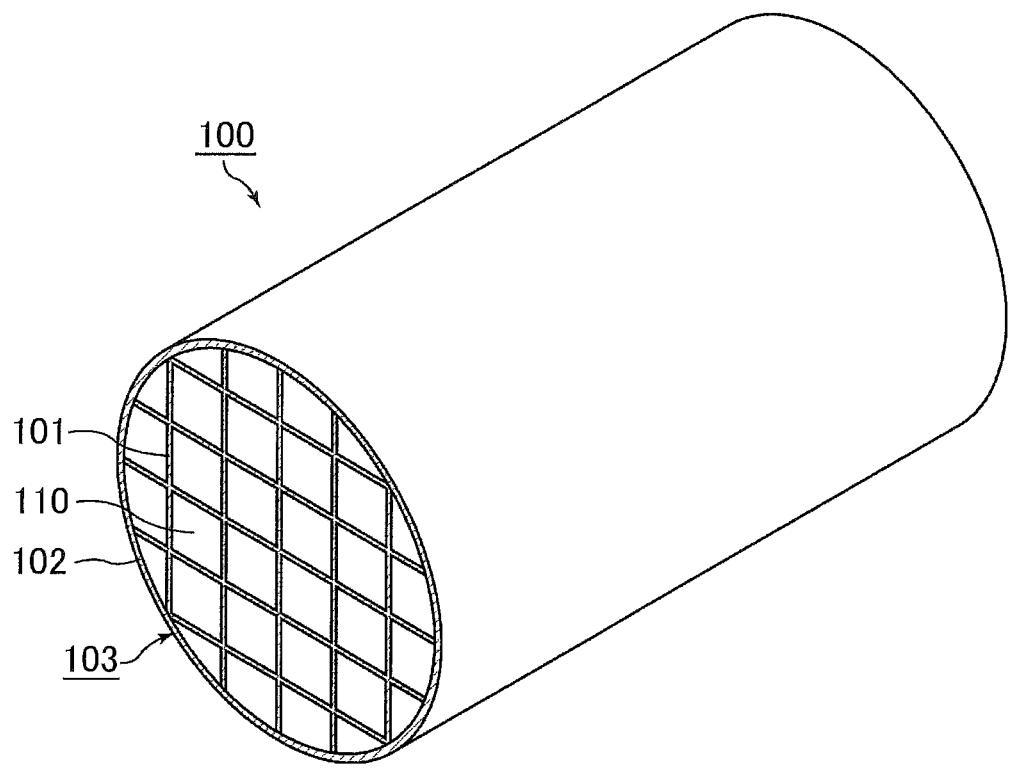
FIG. 1 is a perspective view schematically showing one example of a honeycomb structured body manufactured by the method of manufacturing a honeycomb structured body of an embodiment of the present invention.

The embodiments will now be described with reference to the accompanying drawings, wherein like reference numerals designate corresponding or identical elements throughout the various drawings.

The method of manufacturing a honeycomb structured body according to a first aspect of the embodiments of the present invention includes forming a ceramic block by binding multiple pillar-shaped honeycomb fired bodies with adhesive layers interposed therebetween. The honeycomb fired bodies each have many cells longitudinally disposed in parallel with each other and cell walls between the cells. Each cell wall of the honeycomb fired bodies has a thickness of 0.1 to 0.2 mm and each peripheral wall of the honeycomb fired bodies has a thickness of 0.25 to 0.5 mm. The ceramic block forming includes binding the multiple honeycomb fired bodies on a support by piling up the honeycomb fired bodies successively. The binding includes: determining a placing position where a primary honeycomb fired body is to be placed; fixing a position of an end face of at least one secondary honeycomb fired body by applying force to the end face of the secondary honeycomb fired body, the secondary honeycomb fired body being a honeycomb fired body whose side face is to be opposite to a side face of the primary honeycomb fired body below the placing position; and placing the primary honeycomb fired body on the placing position with the position of the end face of the secondary honeycomb fired body being fixed. The fixing further includes first positioning or second positioning based on the number of secondary honeycomb fired bodies before the fixing, the secondary honeycomb fired bodies each being placed on a position where a side face of the secondary honeycomb fired body is opposite to a side face of the primary honeycomb fired body to be placed. When the at least one secondary honeycomb fired body includes one secondary honeycomb fired body, the first positioning is performed to fix a position of an end face of only the single secondary honeycomb fired body. When the at least one secondary honeycomb fired body includes multiple secondary honeycomb fired bodies, the second positioning is performed to fix positions of first end faces of only the multiple secondary honeycomb fired bodies so as to align the positions of the first end faces of the multiple secondary honeycomb fired bodies.

The term "primary honeycomb fired body" herein means a honeycomb fired body to be placed. The term "secondary honeycomb fired body" herein means a honeycomb fired body placed on a position where a side face thereof is opposite to a side face of the primary honeycomb fired body below the placing position where the primary honeycomb fired body is to be placed.

In the above method of manufacturing a honeycomb structured body, an end face of a secondary honeycomb fired body placed on the position where a side face thereof is to be opposite to a side face of the primary honeycomb fired body is fixed by application of force to the end face of the secondary honeycomb fired body upon placing the primary honeycomb fired body.

Since the position of the end face of the secondary honeycomb fired body is fixed, even at least one of pressing force and vibration applied to the primary honeycomb fired body does not move the position of the secondary honeycomb fired body.

In the method of manufacturing a honeycomb structured body of the embodiments of the present invention, only at least one secondary honeycomb fired body is fixed in the fixing.

The position of at least one secondary honeycomb fired body is surely fixed not by a conventional method of pressing all the end faces of multiple honeycomb fired bodies with one pressing plate as disclosed in JP 2000-7455 A but by a method of fixing only at least one secondary honeycomb fired body.

When the position of an end face of a secondary honeycomb fired body is fixed, even at least one of pressing force and vibration applied to the primary honeycomb fired body is not transmitted to the honeycomb fired bodies below the secondary honeycomb fired body. Thus, the positions of the honeycomb fired bodies below the secondary honeycomb fired body are not moved.

This prevents displacement of all the honeycomb fired bodies below the primary honeycomb fired body to be placed.

Therefore, a honeycomb structured body to be manufactured has no displacement of the honeycomb fired bodies along the longitudinal direction.

Displacement of the honeycomb fired bodies along the longitudinal direction may easily cause breakage of honeycomb fired bodies sticking out in the longitudinal direction during, for example, delivery of the honeycomb structured body to the exhaust pipe of automobiles. On the contrary, the honeycomb structured body manufactured by the method of manufacturing a honeycomb structured body of the embodiments of the present invention has no such a problem.

In the method of manufacturing a honeycomb structured body of the embodiments of the present invention, the position of a secondary honeycomb fired body shifts toward the upper direction as honeycomb fired bodies are piled up successively.

As mentioned above, only at least one secondary honeycomb fired body is fixed. Thus, neither pressing force nor vibration applied to the primary honeycomb fired body is transmitted to the honeycomb fired bodies below the secondary honeycomb fired body. This prevents the cases where a honeycomb fired body on the lower position receives more vibration.

In other words, each honeycomb fired body receives at least one of pressing force and vibration just one time when the honeycomb fired body receives at least one of pressing force and vibration as a primary honeycomb fired body.

Then, neither pressing force nor vibration is applied to the honeycomb fired body in the following steps.

Thus, even a large honeycomb structured body satisfying a predetermined flatness of an end face can be manufactured by joining many honeycomb fired bodies.

The predetermined flatness of an end face varies from client to client to which the honeycomb structured body is delivered, and the flatness is, for example, 2.5 mm or lower.

If the flatness of an end face of the honeycomb structured body deteriorates to exceed 2.5 mm, for example, honeycomb fired bodies sticking out in the longitudinal direction may break during, for example, delivery of a honeycomb structured body to the exhaust pipe of automobiles. On the contrary, the honeycomb structured body manufactured by the method of manufacturing a honeycomb structured body of the embodiments of the present invention has no such a problem.

Further, adjacent honeycomb fired bodies are bonded to each other without displacement between the honeycomb fired bodies along the longitudinal direction thereof. Thus, the bonding area between the adjacent honeycomb fired bodies is large and a sufficient bonding strength is achieved.

Therefore, the method of manufacturing a honeycomb structured body of the embodiments of the present invention provides a honeycomb structured body having a high bonding strength between the honeycomb fired bodies.

In the method of manufacturing a honeycomb structured body of the embodiments of the present invention, the position of an end face of the primary honeycomb fired body to be placed is not fixed in the fixing.

Thus, when at least one of pressing force and vibration is applied to the primary honeycomb fired body, the at least one of pressing force and vibration is transmitted to the adhesive material paste between the primary honeycomb fired body and a secondary honeycomb fired body, so that the adhesive material paste is press-spread to have an even thickness.

This therefore provides an even thickness of the adhesive layer between the honeycomb fired bodies constituting the honeycomb structured body.

An adhesive layer having an uneven thickness between the honeycomb fired bodies constituting the honeycomb structured body may easily cause a low bonding strength at the portion where the adhesive layer is thin. On the contrary, the honeycomb structured body manufactured by the method of manufacturing a honeycomb structured body of the embodiments of the present invention raises no such a problem.

Although the adhesive material paste below a secondary honeycomb fired body receives neither pressing force nor vibration, the thickness thereof has already been made even. Thus, the adhesive material paste needs neither of further pressing force nor vibration.

In the method of manufacturing a honeycomb structured body of the embodiments of the present invention, the cell wall of each honeycomb fired body has a thickness of 0.1 to 0.2 mm, and the peripheral wall of each honeycomb fired body has a thickness of 0.25 to 0.5 mm.

Honeycomb fired bodies having cell walls with a thickness of 0.1 to 0.2 mm provide a honeycomb structured body having low pressure loss. In contrast, a thin cell wall has low mechanical strength. Since the position of a secondary honeycomb fired body is fixed in the method of manufacturing a honeycomb structured body of the embodiments of the present invention, the primary honeycomb fired body is pressed while being stably placed.

Thus, no strong press is required, and even a cell wall having low mechanical strength is less likely to be broken.

In particular, force is applied to an end face of a secondary honeycomb fired body in the method of manufacturing a honeycomb structured body of the embodiments of the present invention; thus, even the peripheral wall and the cell wall having low mechanical strength of the secondary honeycomb fired body are less likely to be broken.

In contrast, when force is applied to a side face of a secondary honeycomb fired body as in the conventional method disclosed in WO 2008/140095 A1, the peripheral wall and the cell wall having low mechanical strength of the secondary honeycomb fired body may easily be broken.

In the method of manufacturing a honeycomb structured body according to a second aspect of the embodiments of the present invention, in the second positioning, the positions of the first end faces of the secondary honeycomb fired bodies are fixed using a plate-like member.

In such fixing using a plate-like member, the first end faces of multiple secondary honeycomb fired bodies are put against the plate-like member to be fixed, so that the first end faces of the multiple secondary honeycomb fired bodies are aligned along the face of the plate-like member. This makes it easy to manufacture a honeycomb structured body with the first end faces of the secondary honeycomb fired bodies being evenly aligned.

Such evenly aligned first end faces of the secondary honeycomb fired bodies prevent breakage of honeycomb fired bodies sticking out in the longitudinal direction during, for example, delivery of a honeycomb structured body to the exhaust pipe of automobiles.

The method of manufacturing a honeycomb structured body according to a third aspect of the embodiments of the present invention further includes, after the fixing, pressing and vibrating in which the primary honeycomb fired body is pressed downwardly and vibration is applied to the primary honeycomb fired body.

The pressing and vibrating make it easy to evenly spread the adhesive material paste between the honeycomb fired bodies.

The evenly spread adhesive material paste between the honeycomb fired bodies provides no thin portion in the resulting adhesive layer. This prevents reduction in bonding strength at a thin portion in the adhesive layer.

In the method of manufacturing a honeycomb structured body according to a fourth aspect of the embodiments of the present invention, the ceramic block includes 36 or more honeycomb fired bodies bound to one another.

This is likely to restrain the following problems even in manufacturing a large honeycomb structured body including a ceramic block formed by binding 36 or more honeycomb fired bodies. The problems include:

(a) large displacement of honeycomb fired bodies along the longitudinal direction;

(b) poor flatness of an end face of the honeycomb structured body;

(c) low bonding strength between the honeycomb fired bodies constituting the honeycomb structured body; and (d) uneven thickness of an adhesive layer between the honeycomb fired bodies constituting the honeycomb structured body.

Therefore, the honeycomb structured body manufactured by the method of manufacturing a honeycomb structured body according to the fourth aspect of the embodiments of the present invention does not raise easy breakage of honeycomb fired bodies sticking out in the longitudinal direction during, for example, delivery of a honeycomb structured body to the exhaust pipe of automobiles. Further, this prevents reduction in bonding strength at a thin portion in the adhesive layer.

In the method of manufacturing a honeycomb structured body according to a fifth aspect of the embodiments of the present invention, the support has a placing face for placing honeycomb fired bodies, and the placing face has a V-shaped cross section perpendicular to the longitudinal direction of the honeycomb fired bodies.

The support having a placing face with a V-shaped cross section is suitably used as a support for placing polygonal-pillar-shaped honeycomb fired bodies.

In the method of manufacturing a honeycomb structured body according to a sixth aspect of the embodiments of the present invention, the support has a placing face for placing honeycomb fired bodies, and the placing face has a semicircular-shaped cross section perpendicular to the longitudinal direction of the honeycomb fired bodies.

The support having a placing face with a semicircular cross section is suitably used as a support for placing honeycomb fired bodies having a curved surface on the peripheral face thereof.

In the method of manufacturing a honeycomb structured body according to a seventh aspect of the embodiments of the present invention, the ceramic block has a quadrangular-pillar shape, and the method further includes cutting a periphery of the ceramic block.

The method of manufacturing a honeycomb structured body according to an eighth aspect of the embodiments of the present invention further includes forming a coat layer on the periphery of the cut ceramic block.

The coat layer prevents leakage of PM from the side faces of the honeycomb structured body. The coat layer also arranges the shape of the peripheral face to give a honeycomb structured body having a predetermined shape.

In the method of manufacturing a honeycomb structured body according to a ninth aspect of the embodiments of the present invention, the honeycomb structured body has a cross section perpendicular to the longitudinal direction thereof, and the cross section has a circular shape, an elliptical shape, a racetrack shape, or a triangular shape with rounded apices.

In the method of manufacturing a honeycomb structured body according to a tenth aspect of the embodiments of the present invention, the diameter of the cross section perpendicular to the longitudinal direction of the honeycomb structured body is 190 mm or longer, or the shortest segment among the segments each of which passes the center of the cross section perpendicular to the longitudinal direction of the honeycomb structured body and connects two points on the circumference of the cross section is 190 mm or longer.

This restrains problems such as:

(a) large displacement of honeycomb fired bodies along the longitudinal direction;

(b) poor flatness of an end face of the honeycomb structured body;

(c) low bonding strength between the honeycomb fired bodies constituting the honeycomb structured body; and (d) uneven thickness of an adhesive layer between the honeycomb fired bodies constituting the honeycomb structured body, even in manufacturing a large honeycomb structured body having the aforementioned shortest segment of 190 mm or longer in length.

Thus, a honeycomb structured body manufactured by the method of manufacturing a honeycomb structured body according to the tenth aspect of the embodiments of the present invention raises no breakage of honeycomb fired bodies sticking out in the longitudinal direction during, for example, delivery of a honeycomb structured body to the exhaust pipe of automobiles. Further, such a honeycomb structured body avoids reduction in bonding strength at a thin portion of the adhesive layer.

In the conventional method disclosed in JP 2000-7455 A, vibration is applied downwardly to a honeycomb fired body to be joined using a vibration-applying means so as to spread the adhesive material paste between the honeycomb fired bodies. The vibration applied to the honeycomb fired body is transmitted not only to the adhesive material paste to be spread but also to the honeycomb fired bodies already joined.

When many honeycomb fired bodies have already been piled up and joined, vibration is transmitted to a honeycomb fired body (a honeycomb fired body placed one stage below) which is placed below the honeycomb fired body to be currently joined with adhesive material paste interposed therebetween, for example.

Further, vibration is also transmitted to a honeycomb fired body (a honeycomb fired body placed two stages below) which is placed below the honeycomb fired body placed one stage below and which is to be joined with the honeycomb fired body placed one stage below with adhesive material paste interposed therebetween.

Thereafter, the vibration is transmitted to a honeycomb fired body three stages below, then a honeycomb fired body four stages below, and finally to all the honeycomb fired bodies.

In the case where vibration is transmitted as in the above example, a honeycomb fired body placed on a lower stage is considered to receive more vibration in total during piling up of many honeycomb fired bodies.

In applying vibration to a honeycomb fired body, the adhesive material paste is not yet cured, so that the relative positions of all the honeycomb fired bodies are not fixed and the honeycomb fired bodies can move along the longitudinal direction thereof.

Such vibration applied to honeycomb fired bodies may cause movement of the honeycomb fired bodies. Thus, a honeycomb fired body placed on a lower stage which receives more vibration in total may more greatly move along the longitudinal direction.

Manufacturing of a large honeycomb structured body requires piling up of honeycomb fired bodies in more stages. Thus, especially in manufacturing a large honeycomb structured body, a honeycomb fired body placed at a lower stage easily moves along the longitudinal direction, so that it tends to shift more greatly from the initial position. This disadvantageously results in difficulty in satisfying a flatness of an end face of a honeycomb structured body desired from clients.

Preferable examples of the large honeycomb structured body include: those prepared by binding 36 or more honeycomb fired bodies; and those satisfying that the diameter of the cross section perpendicular to the longitudinal direction of the honeycomb structured body is 190 mm or longer or the shortest segment among the segments which pass the center of the cross section perpendicular to the longitudinal direction of the honeycomb structured body and which connect any two points of the periphery is 190 mm or longer.

A honeycomb structured body used as a DPF needs to perform a regeneration process which is a process of burning a certain amount of PM captured and accumulated in the honeycomb structured body.

In comparison with small DPFs for small-sized vehicles, large DPFs for large-sized vehicles are considered to require more frequent regeneration processes. Thus, a large DPF tends to burn a smaller amount of PM in one regeneration process and tends to receive a smaller thermal shock. A DPF receiving a smaller thermal shock in a regeneration process seems not to require so high a thermal shock resistance.

In the aforementioned situation, DPFs for large-sized vehicles are considered to require not high thermal shock resistance but low pressure loss.

On the basis of the above situation requiring not high thermal shock resistance but low pressure loss, the pressure loss of a large DPF may be reduced by allowing the honeycomb fired bodies constituting the honeycomb structured body to have a thin cell wall.

In contrast, a honeycomb fired body with a thin cell wall has low mechanical strength. Thus, in the case of applying the conventional bonding method disclosed in JP 2000-7455 A with such a honeycomb fired body, a pressing force applied downward to a honeycomb fired body to be joined needs to be low. Thus, the positions of the honeycomb fired body to be joined and the honeycomb fired bodies placed therebelow are not stable and vibration easily moves the honeycomb fired bodies along the longitudinal direction.

JP 2000-7455 A also discloses pressing of both the end faces of a honeycomb fired body to be joined and the respective honeycomb fired bodies joined using a pair of pressing plates in joining honeycomb fired bodies.

Such pressing of both the end faces of the honeycomb fired body to be joined and the respective honeycomb fired bodies joined using a pair of pressing plates prevents the honeycomb fired bodies from moving along the longitudinal direction.

However, the conventional method of JP 2000-7455 A suppresses movement of all the honeycomb fired bodies along the longitudinal direction. This seems to mean that even vibration applied downward to the honeycomb fired body to be joined fails to spread sufficiently the adhesive material paste between the honeycomb fired bodies, so that the resulting adhesive layer may have uneven thickness.

The method of manufacturing a honeycomb structured body of the embodiments of the present invention, in contrast, can manufacture a honeycomb structured body which has no displacement of the honeycomb fired bodies along the longitudinal direction and which has an adhesive layer with an even thickness between the honeycomb fired bodies.

The following will describe embodiments of the present invention in detail. The present invention is not limited to the following embodiments, and the embodiments may appropriately be modified within the spirit of the present invention.

First Embodiment

The following will describe a first embodiment, which is one embodiment of the method of manufacturing a honeycomb structured body of the embodiment of the present invention, referring to drawings.

First described is one example of a honeycomb structured body to be manufactured in the first embodiment of the method of manufacturing a honeycomb structured body of the embodiment of the present invention.

FIG. 1 is a perspective view schematically showing one example of a honeycomb structured body manufactured by the method of manufacturing a honeycomb structured body of the embodiment of the present invention.

For a honeycomb structured body 100 shown in FIG. 1, multiple honeycomb fired bodies 110 are bonded with adhesive layers 101 interposed therebetween to form a ceramic block 103. A coat layer 102 is formed on the periphery of this ceramic block 103. The coat layer may be formed if necessary.

The honeycomb fired body 110 will be described later; it is preferably a porous ceramic formed from silicon carbide or a silicon-bonded silicon carbide.

The ceramic block 103 shown in FIG. 1 is formed by preparing a quadrangular-pillar-shaped honeycomb aggregate including many quadrangular-pillar-shaped honeycomb fired bodies 110 bound together, and then by cutting the periphery thereof into a round pillar shape.

The honeycomb structured body shown in FIG. 1 has a round pillar shape, and the diameter of the cross section perpendicular to the longitudinal direction thereof is 190 mm or longer.

Figure 2A:
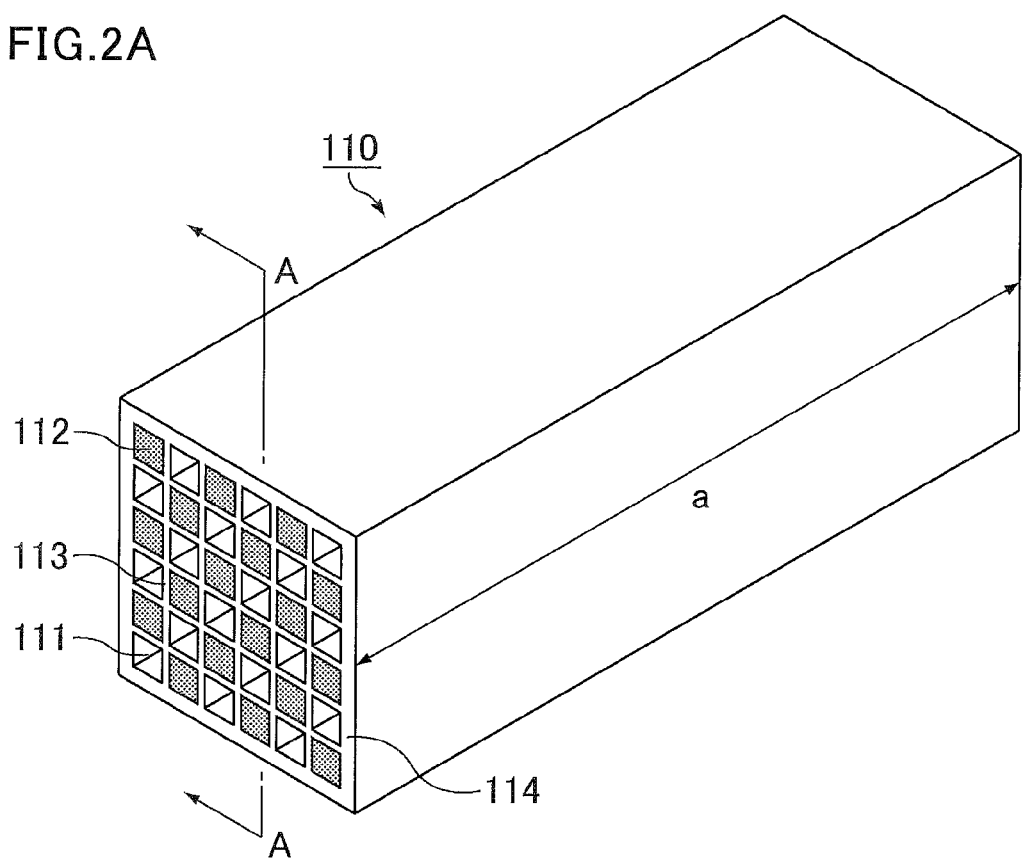
FIG. 2A is a perspective view schematically showing one example of a honeycomb fired body constituting the honeycomb structured body manufactured by the method of manufacturing a honeycomb structured body of an embodiment of the present invention.
Figure 2B:
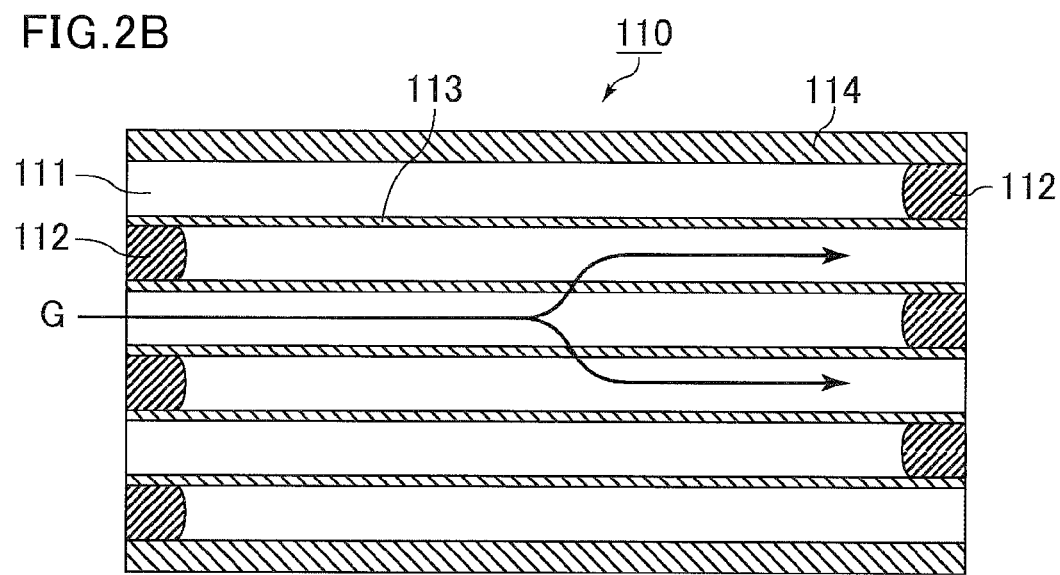
FIG. 2B is an A-A line cross-sectional view of the honeycomb fired body shown in FIG. 2A.

FIG. 2A is a perspective view schematically showing one example of a honeycomb fired body constituting a honeycomb structured body manufactured by the method of manufacturing a honeycomb structured body of the embodiment of the present invention. FIG. 2B is an A-A line cross-sectional view of the honeycomb fired body shown in FIG. 2A.

A honeycomb fired body 110 shown in FIG. 2A and FIG. 2B has many cells 111 disposed in parallel with one another in the longitudinal direction (the direction represented by the arrow "a" in FIG. 2A) and cell walls 113 between the cells, and a peripheral wall 114 is formed around the periphery thereof. Either one end of each cell 111 is sealed with a plug 112.

Thus, exhaust gas G (exhaust gas is represented by G and the flow of the exhaust gas is represented by arrows in FIG. 2B) introduced into a cell 111 having an opening on one end face necessarily passes through a cell wall 113 separating the cells 111, and then flows out from another cell 111 having an opening on the other end face. The cell wall 113 captures PM and other matter in the exhaust gas when the exhaust gas G passes therethrough. Thus, the cell wall 113 serves as a filter.

The honeycomb fired bodies constituting the honeycomb structured body manufactured in the embodiment of the present invention each have a cell wall thickness of 0.1 to 0.2 mm and a peripheral wall thickness of 0.25 to 0.5 mm.

The cell wall thickness of a honeycomb fired body constituting the honeycomb structured body manufactured in the embodiment of the present invention is preferably thinner than the peripheral wall of the honeycomb fired body.

A cell wall having a thickness as thin as 0.1 to 0.2 mm allows exhaust gas to pass through the cell wall easily, providing low pressure loss. A peripheral wall having a thickness of 0.25 to 0.5 mm, which is thicker than the cell wall, has high strength and is highly durable to impact during manufacturing and other procedure, maintaining the strength of the honeycomb fired body high.

The term "cell wall" herein means a wall which is disposed between adjacent cells and is formed from porous ceramic. The term "peripheral wall" herein means a wall which constitutes a part of the side faces of the honeycomb fired body and is formed from porous ceramic.

The following will describe the method of manufacturing a honeycomb structured body of the present embodiment referring to one exemplary case of manufacturing the honeycomb structured body shown in FIG. 1.

The method of manufacturing a honeycomb structured body according to the first embodiment of the present invention includes forming a ceramic block by binding multiple pillar-shaped honeycomb fired bodies with adhesive layers interposed therebetween. The honeycomb fired bodies each have many cells longitudinally disposed in parallel with each other and cell walls between the cells. Each cell wall of the honeycomb fired bodies has a thickness of 0.1 to 0.2 mm and each peripheral wall of the honeycomb fired bodies has a thickness of 0.25 to 0.5 mm. The ceramic block forming includes binding the multiple honeycomb fired bodies on a support by piling up the honeycomb fired bodies successively. The binding includes: determining a placing position where a primary honeycomb fired body is to be placed; fixing a position of an end face of at least one secondary honeycomb fired body by applying force to the end face of the secondary honeycomb fired body, the secondary honeycomb fired body being a honeycomb fired body whose side face is to be opposite to a side face of the primary honeycomb fired body below the placing position; and placing the primary honeycomb fired body on the placing position with the position of the end face of the secondary honeycomb fired body being fixed. The fixing further includes first positioning or second positioning based on the number of secondary honeycomb fired bodies before the fixing, the secondary honeycomb fired bodies each being placed on a position where a side face of the secondary honeycomb fired body is opposite to a side face of the primary honeycomb fired body to be placed. When the at least one secondary honeycomb fired body includes one secondary honeycomb fired body, the first positioning is performed to fix a position of an end face of only the single secondary honeycomb fired body. When the at least one secondary honeycomb fired body includes multiple secondary honeycomb fired bodies, the second positioning is performed to fix positions of first end faces of only the multiple secondary honeycomb fired bodies so as to align the positions of the first end faces of the multiple secondary honeycomb fired bodies.

The method of manufacturing a honeycomb structured body according to the first embodiment of the present invention includes binding multiple honeycomb fired bodies on a support by piling up the honeycomb fired bodies successively.

The binding is first described below in advance of other steps.

Production of a honeycomb fired body and production of adhesive material paste to be used in the binding will be described later.

FIG. 3A, FIG. 3B, FIG. 3C, FIG. 3D, FIG. 3E, and FIG. 3F are diagrams schematically showing the procedure of the binding in the method of manufacturing a honeycomb structured body of the embodiment of the present invention.

The following example of the binding uses quadrangular-pillar-shaped honeycomb fired bodies whose cross section perpendicular to the longitudinal direction has a square shape (see FIG. 2A and FIG. 2B).

A support to be used has a placing face for honeycomb fired bodies, the placing face having a V-shaped cross section (the angle of the V shape is 90°) perpendicular to the longitudinal direction of the honeycomb fired bodies.

Figure 3A:
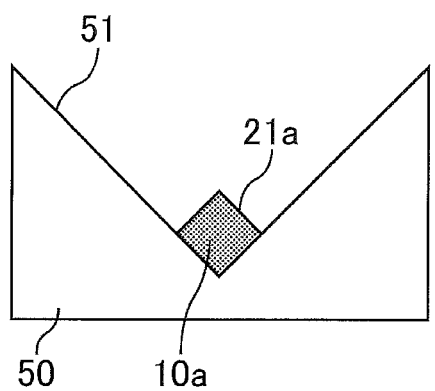
FIG. 3A, FIG. 3B, FIG. 3C, FIG. 3D, FIG. 3E, and FIG. 3F are diagrams schematically showing the procedure of the binding in the method of manufacturing a honeycomb structured body of an embodiment of the present invention.

First, a honeycomb fired body 10a is placed on a placing face 51 of a support 50 (FIG. 3A).

The honeycomb fired body 10a is a honeycomb fired body to be placed, and the honeycomb fired body to be placed is called a primary honeycomb fired body.

In the respective figures, the primary honeycomb fired body is indicated by hatching of black dots.

Then, the position of placing a next primary honeycomb fired body to be placed is determined. This is called determination of a placing position.

In this example, the position opposite to the upper right side face 21a of the honeycomb fired body 10a in FIG. 3A is determined as the placing position.

Figure 3D:
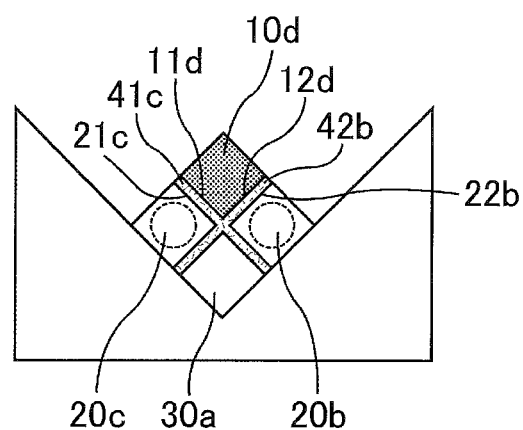
Figure 3B:
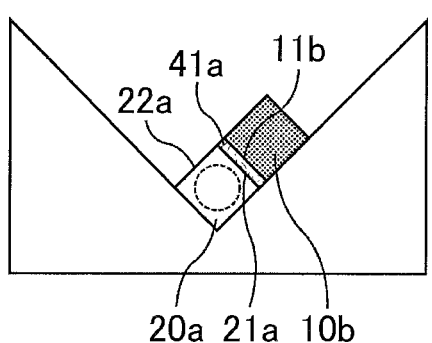

A honeycomb fired body 10b with an adhesive material paste 41a applied thereto is placed so as to contact the side face 21a which is the placing position (FIG. 3B).

In FIG. 3B, the honeycomb fired body 10b is the primary honeycomb fired body.

In the method of manufacturing a honeycomb structured body of the embodiment of the present invention, fixing is performed before the placing of the primary honeycomb fired body. The fixing is described below.

In the fixing, force is applied to an end face of a secondary honeycomb fired body to fix the position of the end face of the secondary honeycomb fired body.

The secondary honeycomb fired body is a honeycomb fired body placed on the position where a side face thereof is opposite to a side face of the primary honeycomb fired body which is the honeycomb fired body to be placed.

In FIG. 3B, a honeycomb fired body 20a placed on the position where the side face 21a is opposite to a side face 11b of a primary honeycomb fired body 10b is the secondary honeycomb fired body.

The secondary honeycomb fired body 20a is the same honeycomb fired body as the first placed honeycomb fired body 10a (see FIG. 3A), but it is not a honeycomb fired body to be placed in FIG. 3B. Thus, the name and the reference sign thereof are changed.

In the respective figures, each secondary honeycomb fired body is indicated by a dotted circle.

In the method of manufacturing a honeycomb structured body of the embodiment of the present invention, the number of secondary honeycomb fired bodies is determined before the fixing.

In FIG. 3B, the honeycomb fired body 20a is the only secondary honeycomb fired body, and the number of secondary honeycomb fired bodies is one.

The fixing includes positioning in which the position of an end face of a secondary honeycomb fired body is fixed.

Examples of an apparatus to be used in the fixing and a specific fixing method will be described later.

In FIG. 3B, the number of secondary honeycomb fired bodies is one, and the fixing of the position of an end face of only the single honeycomb fired body is called first positioning.

After the fixing, the primary honeycomb fired body is placed on the placing position with the position of an end face of a secondary honeycomb fired body being fixed.

In the placing, pressing and vibrating may be performed in which the primary honeycomb fired body is pressed downward and vibration is applied to the primary honeycomb fired body.

The pressing and vibrating are preferably performed every time one honeycomb fired body is placed.

The pressing and vibrating applied onto the primary honeycomb fired body 10b spreads the adhesive material paste 41a into an even thickness due to the vibration of the honeycomb fired body.

Examples of an apparatus to be used in the pressing and vibrating and a specific method will be described later.

Then, the position of placing a next primary honeycomb fired body to be placed is determined.

In this example, the position opposite to an upper left side face 22a of the honeycomb fired body 20a in FIG. 3B is determined as the placing position.

Figure 3E:
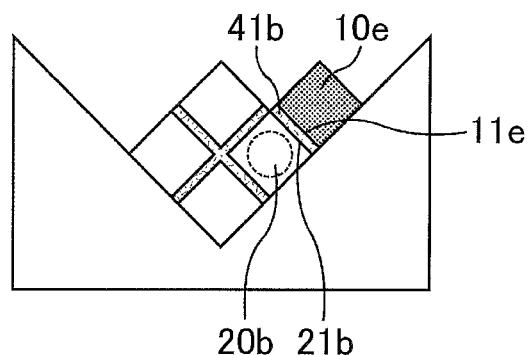
Figure 3C:
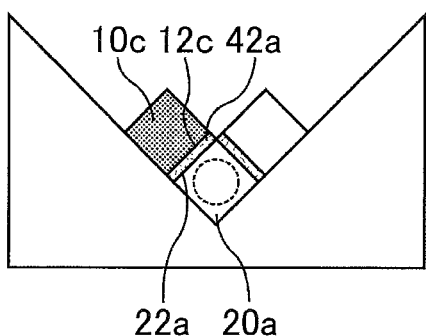

FIG. 3C shows placing of a primary honeycomb fired body 10c.

The primary honeycomb fired body 10c has an adhesive material paste 42a applied to a side face 12c thereof, and is placed so as to contact the side face 22a of the honeycomb fired body 20a.

The placing of the primary honeycomb fired body 10c is the same as the placing of the primary honeycomb fired body 10b shown in FIG. 3B.

The honeycomb fired body 20a is the only secondary honeycomb fired body; in other words, the number of secondary honeycomb fired bodies is one. Thus, the fixing is the first positioning.

Pressing and vibrating applied onto the primary honeycomb fired body 10c spreads the adhesive material paste 42a into an even thickness due to the vibration of the honeycomb fired body.

FIG. 3D shows placing of a primary honeycomb fired body 10d.

The placing position of the primary honeycomb fired body 10d is a position where a side face 12d thereof is opposite to a side face 22b of a secondary honeycomb fired body 20b and a side face 11d thereof is opposite to a side face 21c of a secondary honeycomb fired body 20c.

The primary honeycomb fired body 10d has adhesive material pastes 41c and 42c applied to the side faces 11d and 12d, respectively, and is placed so as to contact the side face 22b of the secondary honeycomb fired body 20b and the side face 21c of the secondary honeycomb fired body 20c.

The honeycomb fired body 20b and the honeycomb fired body 20c are the secondary honeycomb fired bodies; thus, the number of secondary honeycomb fired bodies is two.

In the fixing shown in FIG. 3D, the number of secondary honeycomb fired bodies is plural (two).

With multiple secondary honeycomb fired bodies, the fixing includes second positioning in which the positions of end faces of the secondary honeycomb fired bodies are fixed so as to align the positions of the first end faces of the honeycomb fired bodies.

The "position of the first end face of the honeycomb fired body" will be described below together with examples of an apparatus to be used in the fixing and a specific fixing method.

In the second positioning, only the positions of end faces of secondary honeycomb fired bodies are fixed.

The position of an end face of a tertiary honeycomb fired body, which is neither the primary honeycomb fired body nor the secondary honeycomb fired body, is not fixed.

A honeycomb fired body 30a placed on the lowermost position in FIG. 3D corresponds to a tertiary honeycomb fired body.

Pressing and vibrating applied onto the primary honeycomb fired body 10d spread the adhesive material paste 42b and the adhesive material paste 41c into an even thickness due to vibration of the honeycomb fired body.

When the positions of end faces of the secondary honeycomb fired body 20b and the secondary honeycomb fired body 20c are fixed, neither pressing force nor vibration is transmitted to the adhesive material paste between the secondary honeycomb fired body 20b or secondary honeycomb fired body 20c and the tertiary honeycomb fired body 30a.

Also, neither pressing force nor vibration is transmitted to the tertiary honeycomb fired body 30a.

FIG. 3E shows placing of a primary honeycomb fired body 10e.

The primary honeycomb fired body 10e has an adhesive material paste 41b applied to a side face 11e thereof, and is placed so as to contact a side face 21b of the honeycomb fired body 20b.

The placing of a primary honeycomb fired body 10e is the same as the placing of the primary honeycomb fired body 10b shown in FIG. 3B.

The honeycomb fired body 20b is the only secondary honeycomb fired body and the number of secondary honeycomb fired bodies is one. Thus, the fixing is the first positioning.

Pressing and vibrating applied onto the primary honeycomb fired body 10e spread the adhesive material paste 41b into an even thickness due to vibration of the honeycomb fired body.

Since the position of an end face of the secondary honeycomb fired body 20b is fixed, neither pressing force nor vibration is transmitted to the other part of the adhesive material paste.

Figure 3F:
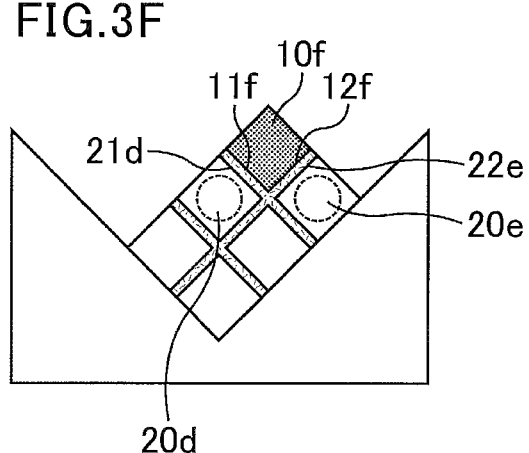

FIG. 3F shows placing of a primary honeycomb fired body 10f.

The position of placing the primary honeycomb fired body 10f is a position where a side face 12f thereof is opposite to a side face 22e of a secondary honeycomb fired body 20e and a side face 11f thereof is opposite to a side face 21d of a secondary honeycomb fired body 20d.

The placing of the primary honeycomb fired body 10f is the same as the placing of the primary honeycomb fired body 10d shown in FIG. 3D.

The honeycomb fired body 20d and the honeycomb fired body 20e are the secondary honeycomb fired bodies and the number of secondary honeycomb fired bodies is two. Thus, the fixing is the second positioning.

Then, placing of a honeycomb fired body is repeated in the same manner, thereby performing the binding of multiple honeycomb fired bodies on a support by piling up the honeycomb fired bodies successively.

Next, one example of an apparatus to be used in the binding and the procedure of the binding using the apparatus are described below referring to the drawings.

Figure 4:
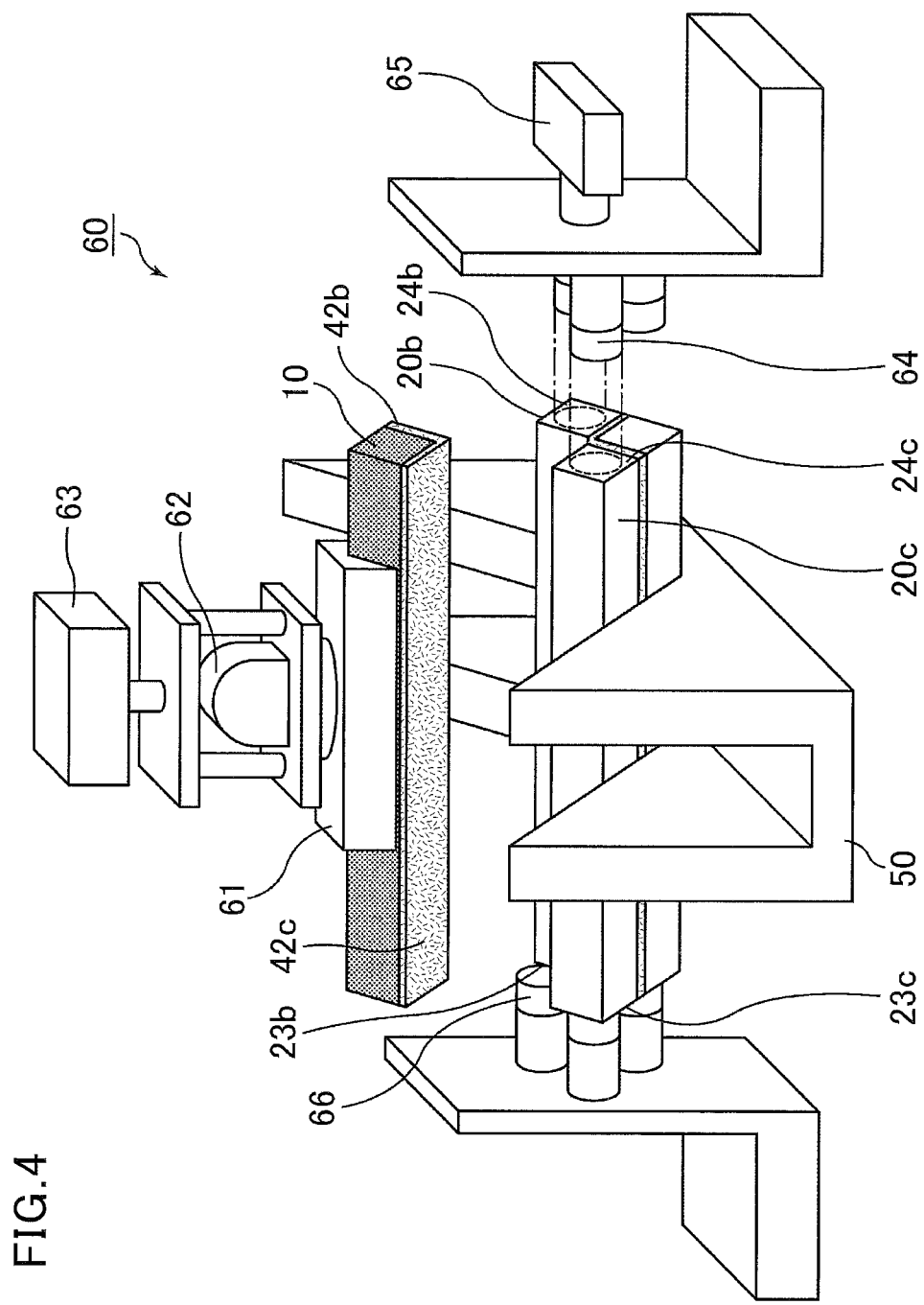
FIG. 4 is a perspective view schematically showing one example of a binding apparatus to be used in the binding in the method of manufacturing a honeycomb structured body of an embodiment of the present invention.

FIG. 4 is a perspective view schematically showing one example of a binding apparatus to be used in the binding in the method of manufacturing a honeycomb structured body of the embodiment of the present invention.

A binding apparatus 60 is an apparatus for placing a primary honeycomb fired body 10 while a honeycomb fired body is placed on a support 50 and the position of an end face of a secondary honeycomb fired body 20 is fixed.

FIG. 4 schematically shows the state of placing a fourth honeycomb fired body (a primary honeycomb fired body 10) while three honeycomb fired bodies are placed on the support 50.

The honeycomb fired body 10 is to be placed on the position where side faces thereof are opposite to side faces of a secondary honeycomb fired body 20b and of a secondary honeycomb fired body 20c.

The side faces of the honeycomb fired body 10 have adhesive material pastes 42b and 42c applied thereto.

The binding apparatus 60 includes end-face-pressing members 64 for pressing the end faces of secondary honeycomb fired bodies, an end-face-pressurizing means 65 for applying pressure to the end-face-pressing members 64, and position-standardizing members 66 which serve as standards for the positions of the end faces of the secondary honeycomb fired bodies.

The secondary honeycomb fired bodies 20b and 20c each have a first end face and a second end face. The first end faces are end faces 23b and 23c on the left side in FIG. 4 and are put against the position-standardizing members 66. The second end faces are end faces 24b and 24c on the right side in FIG. 4 and are pressed by the end-face-pressing members 64.

The end-face-pressing members 64 are movable toward the second end faces 24b and 24c of the secondary honeycomb fired bodies in response to driving of a cylinder as the end-face-pressurizing means 65. FIG. 4 schematically shows by dotted lines how the end-face-pressing members 64 are to move to contact the second end faces 24b and 24c.

Each end-face-pressing member 64 is a round-pillar-shaped member, and is configured such that one end-face-pressing member contact the central portion of the end face of one honeycomb fired body.

The tip portion of the end-face-pressing member 64, the portion to contact the end face of a honeycomb fired body, preferably has no pointed portion so that a pressure does not concentrate on a certain point of the end face of a honeycomb fired body.

In order not to damage the end face of a honeycomb fired body, preferably, the tip portion is formed from a soft material, or a soft material is bonded to the tip portion.

Specific examples of such a material include those prepared by bonding a material such as rubber and resin having a thickness of 1 to 5 mm to a SUS round-pillar-shaped member.

The diameter of the tip portion of the end-face-pressing member is preferably not greater than the end face of a honeycomb fired body.

As the second end faces 24b and 24c of the secondary honeycomb fired bodies 20b and 20c are pressed by the end-face-pressing members 64, the secondary honeycomb fired bodies 20b and 20c move leftward in FIG. 4. Then, the first end faces 23b and 23c of the secondary honeycomb fired bodies 20b and 20c are put against the position-standardizing members 66.

Each position-standardizing member 66 is a round-pillar-shaped member, and the material and the size thereof are the same as those of the end-face-pressing members 64.

The position-standardizing members 66 are different from the end-face-pressing members 64 in that they do not move.

The apparatus has multiple position-standardizing members 66, and one position-standardizing member is configured to contact the end face of one honeycomb fired body.

Preliminary alignment of the positions of the tip faces of the position-standardizing members 66, in other words, the positions of the faces to contact the first end faces 23b and 23c of the secondary honeycomb fired bodies 20b and 20c, enables alignment of the positions of the first end faces 23b and 23c of the secondary honeycomb fired bodies.

Then, pressing of the second end faces 24b and 24c, while the first end faces 23b and 23c are put against the position-standardizing members 66, fixes the positions of the end faces of the secondary honeycomb fired bodies 20b and 20c.

Since the number of secondary honeycomb fired bodies is two, the fixing shown in FIG. 4 corresponds to the second positioning.

The same binding apparatus may be used in the first positioning. In this case, one end-face-pressing member 64 is moved to press the end face of only the single secondary honeycomb fired body.

For the binding apparatus 60, the position of each end-face-pressing member 64 can move up, down, left, and right. Thus, the position of each end-face-pressing member 64 can be adjusted such that the end-face-pressing member 64 contacts the end face of a predetermined honeycomb fired body. Further, the position of each position-standardizing member 66 can also be adjusted in response to the movement of the end-face-pressing members 64.

Alternatively, each end-face-pressing member 64 may be allowed to contact the end face of a predetermined honeycomb fired body by fixing the positions of the end-face-pressing members 64 and the position-standardizing members 66 and then moving the position of the support 50 up, down, left, and right.

The binding apparatus 60 further includes a transport jig 61 for transporting a primary honeycomb fired body to the placing position, a vibrating means 62 for transmitting vibration to the transport jig 61, and a downwardly pressurizing means 63 for applying downwardly a pressure to below the transport jig 61.

The transport jig 61 holds and transports the primary honeycomb fired body 10 to the placing position, and then places it on the placing position. A means for holding a honeycomb fired body of the transport jig 61 may be a vacuum chuck, for example.

When the primary honeycomb fired body 10 is placed, the position of the end face of a secondary honeycomb fired body is fixed by the end-face-pressing member 64.

After the primary honeycomb fired body 10 is placed on the placing position, a pressurizing cylinder as the downwardly pressurizing means 63 is driven to press downwardly the placed primary honeycomb fired body 10. Simultaneously, a vibrator as the vibrating means 62 is driven to apply vibration to the primary honeycomb fired body 10 through the transport jig 61.

The direction of applying vibration is parallel with the longitudinal direction of the primary honeycomb fired body. The vibration is applied in the direction such that the bonded surfaces of the primary honeycomb fired body and the secondary honeycomb fired body are slid each other.

In other words, the downwardly pressurizing means and the vibrating means allow for the pressing and vibrating. The pressing and vibrating evenly spread the adhesive material paste between the honeycomb fired bodies.

After completion of the placing and the pressing and vibrating of the primary honeycomb fired body, the cylinder as the end-face-pressurizing means 65 is driven to move the end-face-pressing members 64 in the direction away from the second end faces 24b and 24c.

Then, the placing position of another primary honeycomb fired body to be placed next is determined, and based on the number and the positions of the secondary honeycomb fired bodies, the end-face-pressing members 64 are moved toward the positions capable of contacting the end faces of the secondary honeycomb fired bodies.

Then, the cylinder as the end-face-pressurizing means 65 is driven to allow the end-face-pressing members 64 to contact the second end faces of the secondary honeycomb fired bodies and to fix the positions of the end faces of the secondary honeycomb fired bodies.

The above steps are repeated, thereby achieving the binding in which multiple honeycomb fired bodies are piled up on a support and the honeycomb fired bodies are bound to each other.

The following will describe the whole method of manufacturing a honeycomb structured body according to the first embodiment of the present invention.

The following case uses silicon carbide as ceramic powder.

(1) First performed is molding in which a wet mixture containing ceramic powder and a binder is extrusion-molded to manufacture a honeycomb molded body.

Specifically, silicon carbide powders having different average particle sizes as ceramic powders, an organic binder, a liquid plasticizer, a lubricant, and water are mixed to prepare a wet mixture for manufacturing a honeycomb molded body.

Then, the wet mixture is put into an extrusion-molding apparatus and extrusion-molded into a honeycomb molded body having a predetermined shape.

This honeycomb molded body is formed using a mold which can provide a cross section having the cell structure (the cell shape and the cell positions) shown in FIG. 2A and FIG. 2B.

(2) The honeycomb molded body is cut into a predetermined length, and the cut article is dried using a drying apparatus such as a microwave drying apparatus, a hot-air drying apparatus, a dielectric drying apparatus, a reduced-pressure drying apparatus, a vacuum drying apparatus, and a freeze drying apparatus. Next performed is sealing in which plug material paste, which is to form plugs, is filled into predetermined cells to seal the cells.

The plug material paste may be the aforementioned wet mixture.

(3) Next performed is degreasing in which the honeycomb molded body is heated in a degreasing furnace so as to remove the organic matter in the honeycomb molded body. The degreased honeycomb molded body is transported into a firing furnace and firing is performed. Thereby, a honeycomb fired body shown in FIG. 2A and FIG. 2B is manufactured.

The plug material paste filled into the end portions of the cells is fired by heating to form plugs. The cutting, the drying, the sealing, the degreasing, and the firing can be performed in conditions conventionally applied for manufacturing honeycomb fired bodies.

(4) Next performed is binding in which multiple honeycomb fired bodies are piled up on a support successively and bound to each other, thereby providing a honeycomb aggregate including the multiple honeycomb fired bodies piled up.

The binding is performed as mentioned above.

The adhesive material paste may be one containing an inorganic binder, an organic binder, and inorganic particles, for example. The adhesive material paste may further contain at least one of inorganic fibers and whiskers.

(5) The honeycomb aggregate is heated so that the adhesive material paste is heat-solidified to be an adhesive layer, thereby providing a quadrangular-pillar-shaped ceramic block.

The adhesive material paste may be heat-solidified in conditions conventionally applied for manufacturing honeycomb structured bodies.

(6) Next performed is cutting of the ceramic block.

Specifically, the periphery of the ceramic block is cut using a diamond cutter, for example, thereby providing a ceramic block whose periphery is processed into a round pillar shape.

(7) Next performed is coat-layer forming in which coat material paste is applied to the peripheral face of the round-pillar-shaped ceramic block and then the paste is dry-solidified into a coat layer.

The coat material paste may be the aforementioned adhesive material paste. The coat material paste may be a paste whose composition is different from that of the adhesive material paste.

The coat layer may not necessarily be formed, and may be formed as appropriate.

The coat layer arranges the shape of the periphery of the ceramic block to provide a round-pillar-shaped honeycomb structured body.

The aforementioned steps allow for manufacturing of the honeycomb structured body according to the first embodiment of the present invention.

The following describes the effects of the method of manufacturing a honeycomb structured body according to the first embodiment of the present invention.

(1) The method of manufacturing a honeycomb structured body in the present embodiment includes fixing of the position of an end face of only the secondary honeycomb fired body.

As the position of the end face of the secondary honeycomb fired body is fixed, neither pressing force nor vibration applied to the primary honeycomb fired body is transmitted to the honeycomb fired bodies placed below the secondary honeycomb fired body. Thus, the honeycomb fired bodies below the secondary honeycomb fired body are not displaced.

This means that all the honeycomb fired bodies placed below the primary honeycomb fired body to be placed are prevented from displacement.

Therefore, a honeycomb structured body can be manufactured without displacement of the honeycomb fired bodies along the longitudinal direction. Displacement of honeycomb fired bodies along the longitudinal direction may cause breakage of honeycomb fired bodies sticking out in the longitudinal direction during, for example, delivery of a honeycomb structured body to the exhaust pipe of automobiles. On the contrary, the honeycomb structured body manufactured by the method of manufacturing a honeycomb structured body according to the present embodiment has no such a problem.

(2) The method of manufacturing a honeycomb structured body according to the present embodiment includes, after the fixing, pressing and vibrating in which the primary honeycomb fired body is pressed downwardly and vibration is applied to the primary honeycomb fired body.

The fixing does not fix the position of an end face of the primary honeycomb fired body to be placed. Thus, at least one of pressing force and vibration applied to the primary honeycomb fired body is transmitted to the adhesive material paste between the primary honeycomb fired body and a secondary honeycomb fired body, so that the adhesive material paste is press-spread into an even thickness.

Therefore, the pressing and vibrating allow the resulting adhesive layer between the honeycomb fired bodies to have an even thickness.

Uneven thickness of the adhesive layer between the honeycomb fired bodies constituting the honeycomb structured body may easily cause reduction in bonding strength at a thin portion of the adhesive layer. On the contrary, the honeycomb structured body manufactured by the method of manufacturing a honeycomb structured body according to the present embodiment has no such a problem.

(3) In the method of manufacturing a honeycomb structured body according to the present embodiment, the cell wall of each honeycomb fired body has a thickness of 0.1 to 0.2 mm and the peripheral wall of each honeycomb fired body has a thickness of 0.25 to 0.5 mm.

Honeycomb fired bodies whose cell walls each have a thickness of 0.1 to 0.2 mm provide a honeycomb structured body having low pressure loss.

A thin cell wall has low mechanical strength. Still, the position of a secondary honeycomb fired body is fixed in the method of manufacturing a honeycomb structured body according to the present embodiment, and thus the primary honeycomb fired body is pressed while the position of the primary honeycomb fired body is stable.

Thus, no strong pressing is required, and thereby even a cell wall having low mechanical strength is less likely to be broken.

(4) In the method of manufacturing a honeycomb structured body according to the present embodiment, the position of an end face of a secondary honeycomb fired body is fixed by applying force to the end face of the secondary honeycomb fired body.

Since force is applied to the end face of the secondary honeycomb fired body, the peripheral wall and the cell wall of the secondary honeycomb fired body is less likely to be broken even if the peripheral wall and the cell wall have low mechanical strength.

(5) In the method of manufacturing a honeycomb structured body according to the present embodiment, the diameter of the cross section perpendicular to the longitudinal direction of the honeycomb structured body is 190 mm or longer, or the shortest segment among the segments which pass the center of the cross section perpendicular to the longitudinal direction of the honeycomb structured body and which connect any two points of the periphery is 190 mm or longer.

Even in manufacturing a large honeycomb structured body having the segment length of 190 mm or longer, the present method can restrain problems, including:

(a) large displacement along the longitudinal direction of the honeycomb fired body;

(b) poor flatness of an end face of the honeycomb structured body;

(c) low bonding strength between the honeycomb fired bodies constituting the honeycomb structured body; and (d) uneven thickness of an adhesive layer between the honeycomb fired bodies constituting the honeycomb structured body.

Thus, the honeycomb structured body manufactured by the method of manufacturing a honeycomb structured body according to the present embodiment raises no breakage of honeycomb fired bodies sticking out in the longitudinal direction during, for example, delivery of a honeycomb structured body to the exhaust pipe of automobiles. In addition, it has no reduction in bonding strength at a thin portion of the adhesive layer.

The following will describe the examples which more specifically disclose the method of manufacturing a honeycomb structured body according to the first embodiment of the present invention. The present invention is not limited to these examples.

Example 1

Production of Honeycomb Fired Body

First, silicon carbide coarse powder having an average particle size of 22 μm (54.6% by weight) and silicon carbide fine powder having an average particle size of 0.5 μm (23.4% by weight) were mixed to give a mixture. This mixture was kneaded with an organic binder (methyl cellulose) (4.3% by weight), a lubricant (UNILUB, NOF Corp.) (2.6% by weight), glycerin (1.2% by weight), and water (13.9% by weight) to give a wet mixture. This wet mixture was then subjected to the extrusion-molding.

This step provided a raw honeycomb molded body which has a shape similar to that of the honeycomb fired body 110 shown in FIG. 2A and the cells of which are not sealed.

Next, the raw honeycomb molded body was dried using a microwave drying apparatus, thereby providing a dried honeycomb molded body. Plug material paste was filled into predetermined cells of the dried honeycomb molded body to seal the cells. The wet mixture was used as the plug material paste. After the sealing of the cells, the dried honeycomb molded body with the plug material paste filled into the cells was again dried using a drying apparatus.

Next, the cell-sealed dried honeycomb molded body was degreased at 400° C., and then fired at 2200° C. for three hours in normal pressure argon atmosphere.

This provided a quadrangular-pillar-shaped honeycomb fired body.

The honeycomb fired body is formed from a porous silicon carbide sintered body, and has a porosity of 42%, an average pore diameter of 9 μm, a size of 34.3 mm×34.3 mm×200 mm, the number of cells (cell density) of 46.5 pcs/cm$^2$ (300 pcs/inch$^2$), a cell wall thickness of 0.18 mm, and a peripheral wall thickness of 0.3 mm.

(Binding)

Eighty-one honeycomb fired bodies obtained through the above procedure were bound to each other with adhesive layers interposed therebetween to provide a honeycomb aggregate.

First, adhesive material paste was prepared from silicon carbide having an average particle size of 0.6 μm (30.0% by weight), silica sol (solids content: 30% by weight) (21.4% by weight), carboxymethyl cellulose (8.0% by weight), and water (40.6% by weight).

Based on the procedure described in the method of manufacturing a honeycomb structured body of the first embodiment of the present invention referring to FIG. 3A, FIG. 3B, FIG. 3C, FIG. 3D, FIG. 3E, and FIG. 3F, the binding was performed in which the honeycomb fired bodies were piled up on a support having a placing face having a V-shaped cross section.

In the fixing, only the position of an end face of a secondary honeycomb fired body was fixed. With multiple secondary honeycomb fired bodies, the positions of the first end faces of the secondary honeycomb fired bodies were fixed so as to align each of the first end faces of the secondary honeycomb fired bodies.

In the binding, the position of an end face of a secondary honeycomb fired body was fixed using a binding apparatus shown in FIG. 4, followed by the placing and the pressing and vibrating.

In the pressing and vibrating, the primary honeycomb fired body was pressed downwardly and vibrated using a downwardly pressurizing means and a vibrating means of the binding apparatus shown in FIG. 4. The direction of applying vibration is the direction in which the bonding faces between the primary honeycomb fired body and the secondary honeycomb fired body were slid to each other.

The above procedure was repeated, thereby binding 81 honeycomb fired bodies to form a honeycomb aggregate.

The cross section of the honeycomb aggregate was quadrangle.

Then, the honeycomb aggregate was dried at 180° C. for 20 minutes so that the adhesive material paste was dry-solidified to form an adhesive layer, thereby providing a ceramic block.

The periphery of the ceramic block was cut using a diamond cutter, thereby providing a round-pillar-shaped ceramic block having a diameter of 302.8 mm.

Next, coat material paste was applied to the peripheral portion of the round-pillar-shaped ceramic block and the coat material paste was heat-solidified at 120° C., thereby providing a peripheral coat layer having a thickness of 1.0 mm on the peripheral portion of the ceramic block. Here, the adhesive material paste was used as the peripheral coat material paste.

The aforementioned procedure provided a round-pillar-shaped honeycomb structured body having a diameter of 304.8 mm and a length of 200 mm.

Comparative Example 1

A honeycomb structured body was manufactured in the same manner as in Example 1 except that after the placing in the binding, the pressing and vibrating were performed while the whole end faces of the honeycomb fired body to be bonded and the honeycomb fired bodies bonded were pressed using a pair of pressing plates to restrain the movement of the honeycomb fired bodies along the longitudinal direction.

Comparative Example 2

A honeycomb structured body was manufactured in the same manner as in Example 1 except that in the binding, the pressing and vibrating were performed after the primary honeycomb fired body was placed without fixing any of the positions of the end faces of the honeycomb fired bodies.
(Evaluation of Displacement of Honeycomb Fired Bodies)

Displacement of honeycomb fired bodies along the longitudinal direction was evaluated by the following method.

The displacement was determined as follows.

A honeycomb structured body was placed on a coordinate measuring machine (Mitutoyo Corp., product No.: Crysta-Apex 9106) with an end face thereof upward, and the Z-coordinate of each honeycomb fired body near the center was measured.

The Z-coordinates were each measured by bringing a measurement probe of the coordinate measuring machine into contact with the vicinity of the center of each honeycomb fired body placed on the coordinate measuring machine.

With respect to the Z-coordinates in the vicinities of the centers of the respective honeycomb fired bodies, the Z-coordinate of the first measured honeycomb fired body was defined as Z1, the Z-coordinate of the second measured honeycomb fired body was defined as Z2, and the Z-coordinate of the Nth measured honeycomb fired body was defined as Zn.

Then, the maximum value Zmax and the minimum value Zmin among the Z1, Z2, . . . , and Zn were determined.

Finally, the difference between the maximum value Zmax and the minimum value Zmin (Zmax−Zmin) of the Z-coordinates at the end face was calculated to determine the displacement.

Table 1 shows the results in Example 1 and Comparative Examples 1 and 2.
(Evaluation of Thickness of Adhesive Layer)

The thickness of each adhesive layer between honeycomb fired bodies was measured using a vision measuring apparatus (NIKON CORP., product No.: MM-40), and the difference between the maximum value and the minimum value among the thicknesses of the adhesive layers were calculated.

The difference between the maximum value and the minimum value among the thicknesses of the adhesive layers was calculated as follows.

The measurement site of each adhesive layer between honeycomb fired bodies was the vicinity of the center of the side faces of the honeycomb fired bodies.

In the case of measuring the thickness of the adhesive layer between a honeycomb fired body A and a honeycomb fired body B, a point "a" was set as the starting point and a point "b" was set as the ending point, where the point "a" is near the center of the side face of the honeycomb fired body A and the point "b" is an intersection point between the side face of the honeycomb fired body B and the perpendicular line extended from the point "a" across the adhesive layer.

Then, the distance between the point "a" and the point "b" was measured using an analysis program of the vision measuring apparatus. This distance was defined as the thickness of the adhesive layer.

For all the adhesive layers between the honeycomb fired bodies, the thickness was measured as mentioned above, and the maximum value Tmax and the minimum value Tmin among the thicknesses of the adhesive layers were determined.

Finally, the difference between the maximum value Tmax and the minimum value Tmin (Tmax−Tmin) among the thicknesses of the adhesive layers was determined and was defined as a thickness unevenness (mm).

Table 1 shows the results of Example 1 and Comparative Examples 1 and 2.

TABLE 1

| | Fixing | Displacement of honeycomb fired bodies (mm) | Thickness unevenness among adhesive layers (mm) |
|---|---|---|---|
| Example 1 | Fix only end face of second honeycomb fired body | 1.0 | 1.0 |
| Comparative Example 1 | Fix all end faces of all honeycomb fired bodies | 0.8 | 2.0 |
| Comparative Example 2 | No fixing | 2.5 | 1.1 |

Table 1 shows that in Example 1 where the pressing and vibrating were performed with the position of an end face of only the secondary honeycomb fired body being fixed, the displacement of the honeycomb fired bodies was 1.0 mm and the thickness unevenness among the adhesive layers was 1.0 mm.

In Comparative Example 1 where the whole end faces of all the honeycomb fired bodies were fixed in the pressing and vibrating, the honeycomb fired bodies showed a displacement of 0.8 mm, but the adhesive layers showed a thickness unevenness of as large as 2.0 mm.

This is presumably because fixing of the whole end faces of the honeycomb fired bodies prevents transmission of vibration to the adhesive material paste, so that the adhesive material paste fails to spread evenly.

In Comparative Example 2, where none of the positions of the end faces of the honeycomb fired bodies were fixed in the pressing and vibrating, the adhesive layers had a thickness unevenness of 1.1 mm but the honeycomb fired bodies had a displacement as large as 2.5 mm.

This is presumably because the vibration was transmitted to the lower honeycomb fired bodies so that more vibration in total was transmitted to the honeycomb fired bodies placed on lower stages in the pressing and vibrating.

As mentioned above, Example 1 according to the method of manufacturing a honeycomb structured body of one embodiment of the present invention is better than Comparative Examples 1 and 2 in that it less suffers from a displacement of the honeycomb fired bodies along the longitudinal direction and a thickness unevenness among the adhesive layers.

Therefore, in comparison with the honeycomb structured bodies manufactured in Comparative Examples 1 and 2, the honeycomb structured body manufactured in Example 1 according to the method of manufacturing a honeycomb structured body of one embodiment of the present invention presumably raises no breakage of honeycomb fired bodies sticking out in the longitudinal direction during, for example, delivery of a honeycomb structured body to the exhaust pipe of automobiles. It presumably has no reduction in bonding strength at a thin portion of the adhesive layer.

Second Embodiment

The following will describe a second embodiment which is one embodiment of the present invention.

In the method of manufacturing a honeycomb structured body according to the present embodiment, the positions of the first end faces of multiple secondary honeycomb fired bodies are fixed using a plate-like member in the second positioning.

Figure 5:
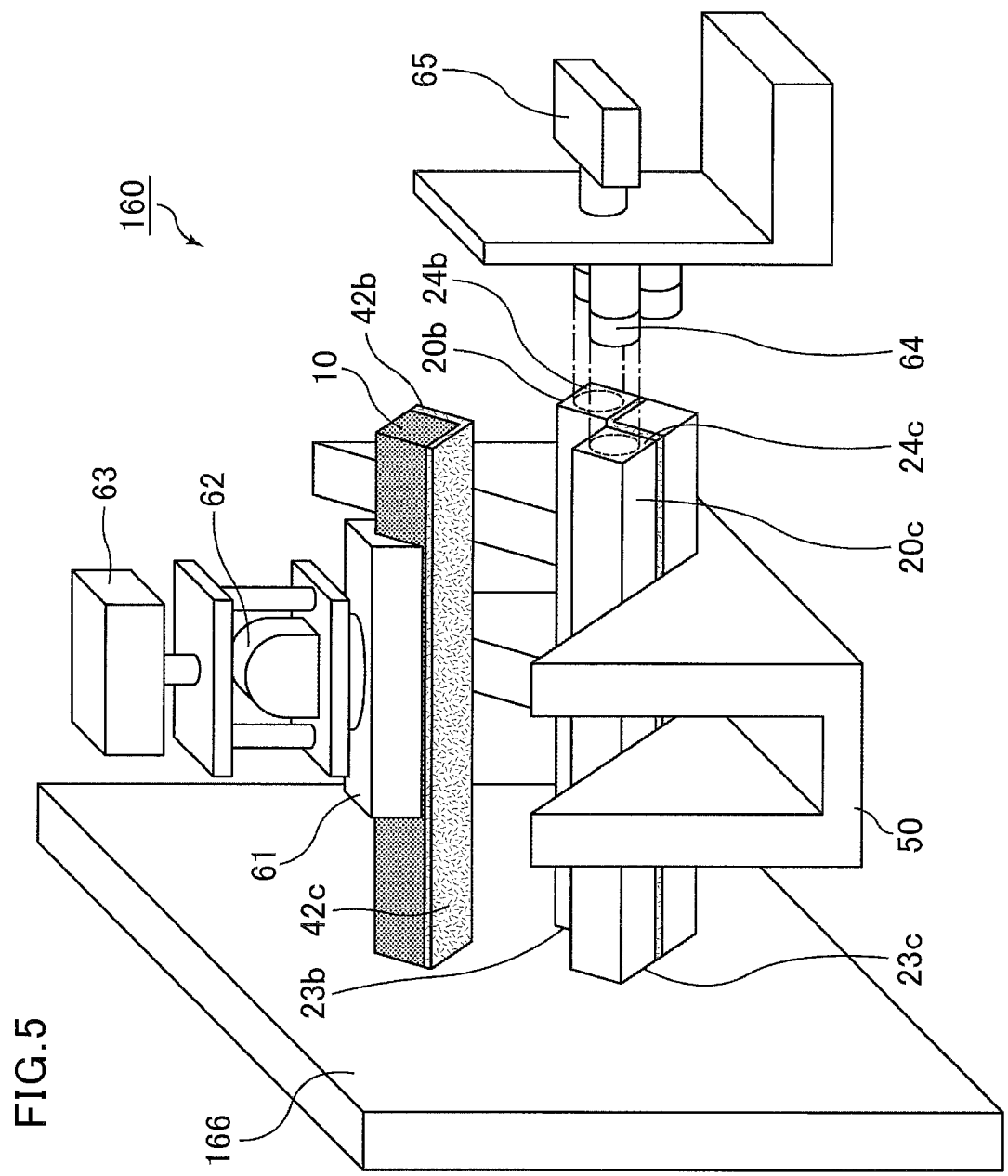
FIG. 5 is a perspective view schematically showing another example of a binding apparatus to be used in the binding in the method of manufacturing a honeycomb structured body of an embodiment of the present invention.

FIG. 5 is a perspective view schematically showing another example of a binding apparatus to be used in the binding in the method of manufacturing a honeycomb structured body of the embodiment of the present invention.

A binding apparatus 160 shown in FIG. 5 has a structure similar to that of the binding apparatus 60 shown in FIG. 4 except that the position-standardizing member thereof is different from that of the binding apparatus 60.

The position-standardizing member 166 of the binding apparatus 160 is a plate-like member having a plane substantially the same size as the end face of a ceramic block to be manufactured.

The material thereof is the same as that of each end-face-pressing member 64.

The position-standardizing member 166 has a face to contact with the end face of a honeycomb fired body, and this face has a high flatness.

The flatness of an end face of a ceramic block to be manufactured in the present embodiment is to be substantially the same as that of the position-standardizing member 166. Thus, the flatness of the position-standardizing member 166 is preferably higher (the surface is flatter), and is preferably 2.5 mm or lower.

The flatness is a degree of deviation of a plane from a geometrically correct plane (referred to as a geometric plane) as defined in JIS B0621, and is the distance between two parallel geometric planes sandwiching the target plane.

In the fixing of the present embodiment, the secondary honeycomb fired bodies 20b and 20c move leftward in FIG. 5 as the second end faces 24b and 24c thereof are pressed by end-face-pressing members 64. Then, the first end faces 23b and 23c of the secondary honeycomb fired bodies 20b and 20c are put against the position-standardizing member 166 to be fixed.

Since the first end faces of the multiple secondary honeycomb fired bodies are put against the same plate-like member and are fixed, the positions of the first end faces of the secondary honeycomb fired bodies are aligned along the plane of the plate-like member.

Thus, a honeycomb structured body can be manufactured while the first end faces of the secondary honeycomb fired bodies are evenly aligned.

The other steps are similar to those in the method of manufacturing a honeycomb structured body of the first embodiment of the present invention, and thus the specific description thereof is omitted here.

The method of manufacturing a honeycomb structured body according to the second embodiment of the present invention exerts not only the effects (1) to (5) described in the first embodiment of the present invention but also the following effect.

(6) In the method of manufacturing a honeycomb structured body according to the present embodiment, the positions of the first end faces of multiple secondary honeycomb fired bodies are fixed using a plate-like member in the second positioning.

Fixing with a plate-like member includes putting the first end faces of the secondary honeycomb fired bodies against the plate-like member to fix the positions thereof, so that the positions of the first end faces of the secondary honeycomb fired bodies are aligned along the face of the plate-like member. Thus, a honeycomb structured body can be manufactured while the flatnesses of the first end faces of the secondary honeycomb fired bodies are aligned.

Such aligned flatnesses of the first end faces of the secondary honeycomb fired bodies prevent breakage of honeycomb fired bodies sticking out in the longitudinal direction during, for example, delivery of a honeycomb structured body to the exhaust pipe of automobiles.

Third Embodiment

The following will describe a third embodiment which is one embodiment of the present invention.

In the method of manufacturing a honeycomb structured body according to the present embodiment, the honeycomb structured body to be manufactured is different from the honeycomb structured body to be manufactured in the first embodiment of the present invention.

Further, the shape of a support to be used in the fixing and the order of placing honeycomb fired bodies in the fixing are also different from those in the first embodiment.

First described is one example of a honeycomb structured body to be manufactured in the method of manufacturing a honeycomb structured body of the third embodiment of the present invention.

Figure 6:
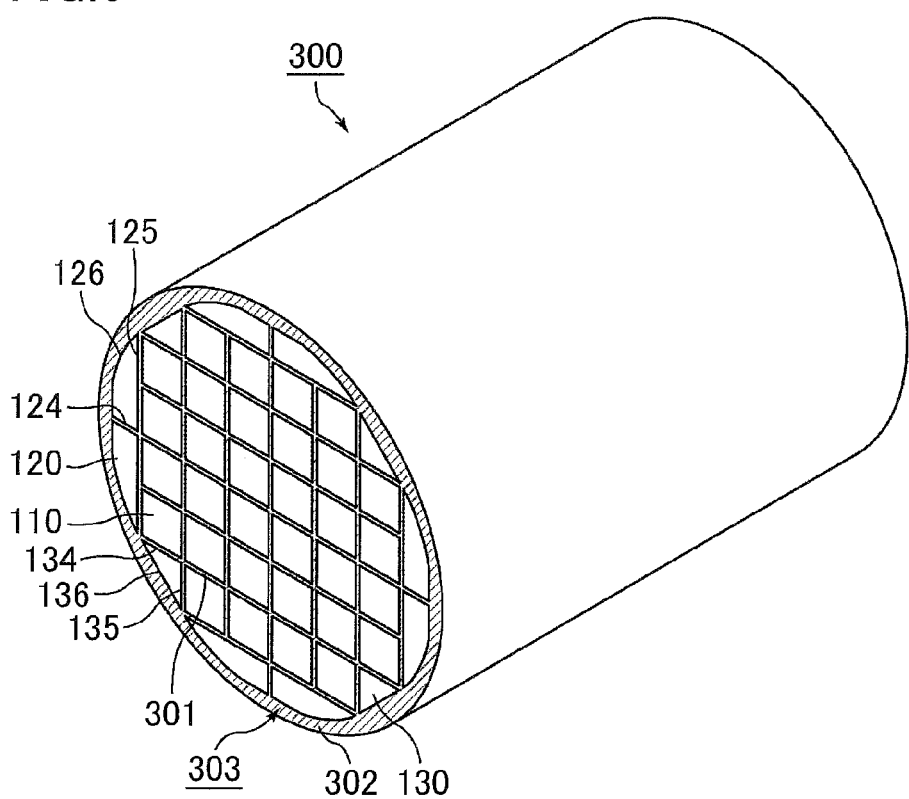
FIG. 6 is a perspective view schematically showing one example of a honeycomb structured body manufactured by the method of manufacturing a honeycomb structured body of an embodiment of the present invention.

FIG. 6 is a perspective view schematically showing one example of a honeycomb structured body manufactured by the method of manufacturing a honeycomb structured body of the embodiment of the present invention.

Figure 7:
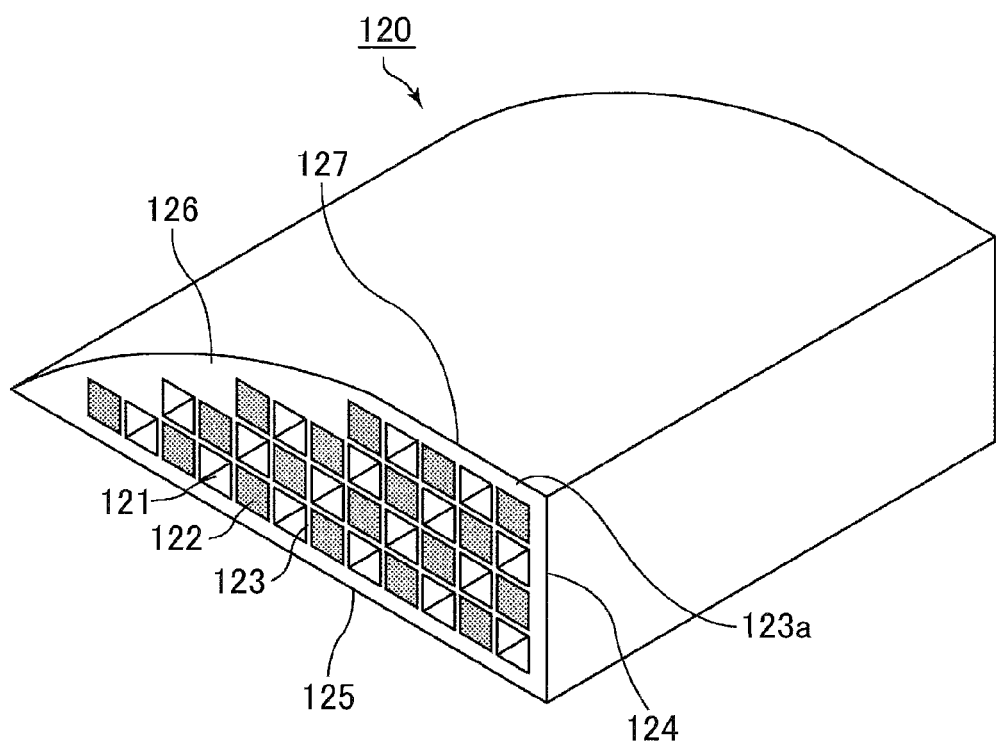
FIG. 7 is a perspective view schematically showing one example of a second-shape unit which is one of the honeycomb fired bodies constituting the honeycomb structured body shown in FIG. 6.

FIG. 7 is a perspective view schematically showing one example of a second-shape unit which is one of the honeycomb fired bodies constituting the honeycomb structured body shown in FIG. 6.

Figure 8:
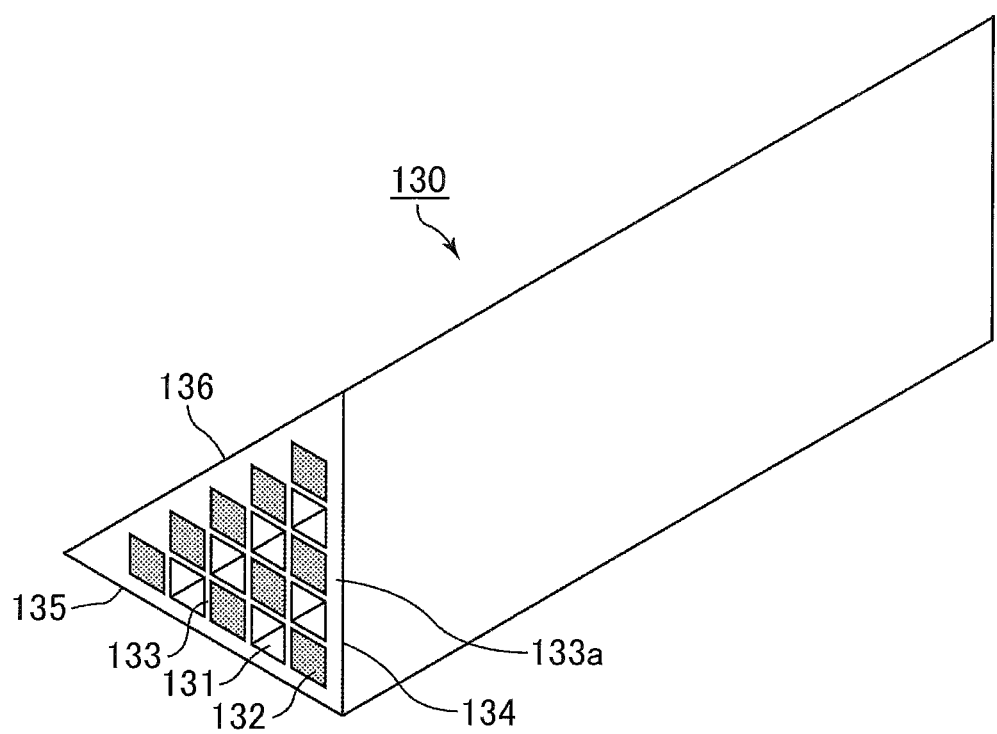
FIG. 8 is a perspective view schematically showing one example of a third-shape unit which is one of the honeycomb fired bodies constituting the honeycomb structured body shown in FIG. 6.

FIG. 8 is a perspective view schematically showing one example of a third-shape unit which is one of the honeycomb fired bodies constituting the honeycomb structured body shown in FIG. 6.

A honeycomb structured body 300 shown in FIG. 6 includes honeycomb fired bodies 110 (in the present embodiment, referred to as first-shape units 110) each having the shape as shown in FIG. 2A and FIG. 2B, honeycomb fired bodies 120 (second-shape units 120) each having the shape as shown in FIG. 7, and honeycomb fired bodies 130 (third-shape units 130) each having the shape as shown in FIG. 8. These honeycomb fired bodies are each formed from porous silicon carbide, and are bound to each other with adhesive layers 301 interposed therebetween to form a ceramic block 303. A coat layer 302 is further formed on the periphery of this ceramic block 303.

Each first-shape unit 110 may be a quadrangular-pillar-shaped honeycomb fired body similar to the honeycomb fired body used in the method of manufacturing a honeycomb structured body according to the first embodiment of the present invention. Thus, the description thereof is omitted here. The first-shape unit 110 is a unit having a quadrangular cross section.

The term "cross section" herein means the cross section perpendicular to the longitudinal direction.

Each second-shape unit 120 shown in FIG. 7 also has many cells 121, plugs 122, and cell walls 123 similar to the first-shape unit 110. Thus, the second-shape unit 120 serves as a filter for capturing PM.

The peripheral portion of the second-shape unit 120 has a peripheral wall 123a which is constituted by the cell wall.

The peripheral wall 123a is thicker than the cell wall 123.

The cross section perpendicular to the longitudinal direction of the second-shape unit 120 includes a first side 124, a second side 125, a third side 127, and a sloping side 126.

The first side 124 and the second side 125 form a right angle, and the sloping side 126 is formed opposite to the right angle. The sloping side 126 consists of a circular arc.

The phrase "opposite to the right angle" herein means that the side is neither of the sides forming the right angle.

The third side 127 connects the sloping side 126 and the first side 124, and the third side 127 is parallel with the second side 125.

Therefore, the second-shape unit 120 is a unit of sectoral cross section having one circular arc and three straight lines.

Each third-shape unit 130 shown in FIG. 8 also includes many cells 131, plugs 132, and cell walls 133 similar to the first-shape unit 110. Thus, the third-shape unit 130 serves as a filter for capturing PM.

The peripheral portion of the third-shape unit 130 has a peripheral wall 133a formed from the cell wall.

The peripheral wall 133a is thicker than the cell wall 133.

The cross section perpendicular to the longitudinal direction of the third-shape unit 130 has a triangular shape, and thus the third-shape unit 130 is a unit of triangular cross section.

The cross section perpendicular to the longitudinal direction of the third-shape unit 130 has a right-angled isosceles triangular shape consisting of a first side 134 and a second side 135 together forming a right angle, and an oblique side 136 opposite to the right angle.

For the first-shape units, the second-shape units, and the third-shape units, each cell wall of the honeycomb fired bodies has a thickness of 0.1 to 0.2 mm, and each peripheral wall of the honeycomb fired bodies has a thickness of 0.25 to 0.5 mm.

The honeycomb structured body 300 shown in FIG. 6 has first-shape units 110 (units of quadrangular cross section) at the central portion of the cross section thereof. The number of the first-shape units 110 is 32.

Around the first-shape units 110 are disposed eight second-shape units 120 (units of sectoral cross section). The second-shape units 120 are disposed such that the second sides 125 thereof are adjacent to the first-shape units 110. They are disposed also such that the sloping sides 126 constitute the peripheral face of the ceramic block. They are disposed also such that the first sides 124 of two second-shape units 120 are adjacent to each other.

At portions around the first-shape units 110 and without a second-shape unit 120 are disposed four third-shape units 130 (units of triangular cross section).

The third-shape units 130 are disposed such that the first sides 134 and the second sides 135 thereof are adjacent to the first-shape units 110. They are disposed also such that the oblique sides 136 constitute the peripheral face of the ceramic block.

This honeycomb structured body 300 includes 44 honeycomb fired bodies in total. They consist of 32 first-shape units, eight second-shape units, and four third-shape units.

The 44 honeycomb fired bodies are bound to each other with adhesive layers 301 interposed therebetween to form a ceramic block 303.

Further, a coat layer 302 is formed on the peripheral face of the ceramic block 303, and the cross section perpendicular to the longitudinal direction of the honeycomb structured body 300 has a circular shape.

This honeycomb structured body of circular cross section has a diameter of 190 mm or greater.

The following will describe the method of manufacturing a honeycomb structured body according to the present embodiment for manufacturing the honeycomb structured body shown in FIG. 6.

First described is binding to manufacture a ceramic block 303 constituting the honeycomb structured body 300 shown in FIG. 6.

FIG. 9A, FIG. 9B, FIG. 9C, and FIG. 9D are diagrams schematically showing the procedure of the binding in the method of manufacturing a honeycomb structured body of the embodiment of the present invention.

In this example, a support 50 is the same as that used in the binding in the method of manufacturing a honeycomb structured body according to the first embodiment of the present invention, having a placing face of V-shaped cross section (the angle of the V shape is 90°).

Figure 9A:
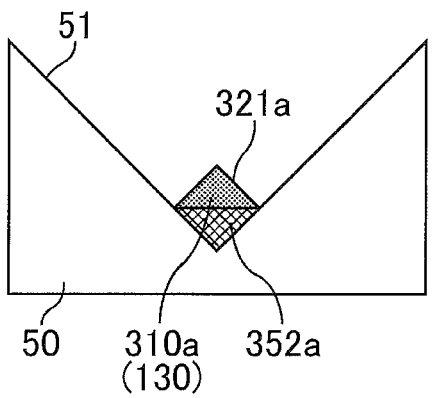
FIG. 9A, FIG. 9B, FIG. 9C, and FIG. 9D are diagrams schematically showing the procedure of the binding in the method of manufacturing a honeycomb structured body of an embodiment of the present invention.

A triangular-pillar-shaped triangular jig 352a is placed on a placing face 51 of the support 50 (FIG. 9A). The shape of the triangular jig 352a is the same as the outer shape of the third-shape unit 130 shown in FIG. 8, and has no cells.

As shown in FIG. 9A, a honeycomb fired body 310a is placed on the triangular jig 352a.

The honeycomb fired body 310a is a third-shape unit 130.

The position opposite to the upper right side face 321a of the honeycomb fired body 310a is defined as the placing position for placing a next honeycomb fired body.

Figure 9D:
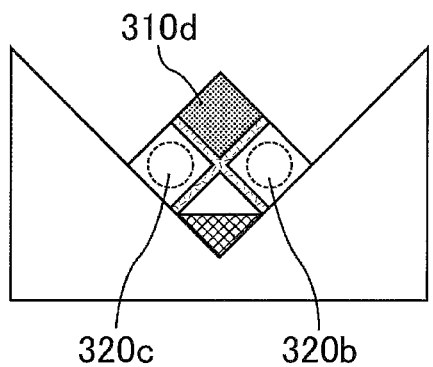
Figure 9B:
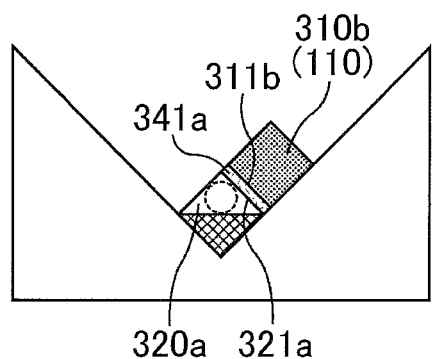

As shown in FIG. 9B, a honeycomb fired body 310b with an adhesive material paste 341a applied to a side face 311b thereof is placed so as to contact the side face 321a, in other words, placed on the placing position.

In FIG. 9B, the honeycomb fired body 310b is a first-shape unit 110 and is a primary honeycomb fired body to be placed.

In the placing shown in FIG. 9B, the honeycomb fired body 320a placed at the position where the side face 321a thereof is opposite to the side face 311b of the primary honeycomb fired body 310b is the secondary honeycomb fired body.

The secondary honeycomb fired body 320a is the firstly placed honeycomb fired body 310a, and is a honeycomb fired body the position of an end face of which is to be fixed in the fixing.

The honeycomb fired body 320a is the only secondary honeycomb fired body, and the number of secondary honeycomb fired bodies is one. Thus, the fixing is the first positioning.

In the method of manufacturing a honeycomb structured body according to the present embodiment, fixing is performed in which the position of an end face of the secondary honeycomb fired body is fixed in the same procedure as the fixing in the method of manufacturing a honeycomb structured body according to the first embodiment of the present invention.

An apparatus to be used in the fixing may be the same binding apparatus described in the method of manufacturing a honeycomb structured body according to the first embodiment and the second embodiment of the present invention.

The area of an end face of each third-shape unit 130 is half the area of an end face of each first-shape unit 110. Thus, the end-face-pressing member for pressing an end face of a third-shape unit 130 preferably has a small-diameter portion (tip portion) contacting the end face of the honeycomb fired body.

Figure 9C:
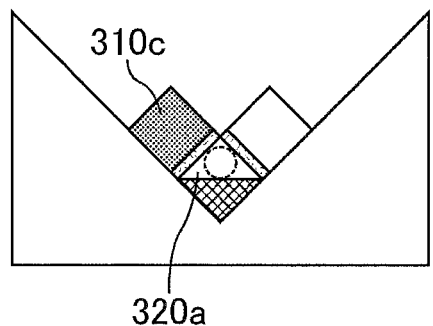

Next, a primary honeycomb fired body 310c is placed as shown in FIG. 9C.

The step of placing the primary honeycomb fired body 310c is the same as the step of placing the primary honeycomb fired body 310b shown in FIG. 9B.

The honeycomb fired body 320a is the only secondary honeycomb fired body, and the number of secondary honeycomb fired bodies is one. Thus, the fixing is the first positioning.

Next, a primary honeycomb fired body 310d is placed as shown in FIG. 9D.

The placing of the primary honeycomb fired body 310d is the same as the placing of the primary honeycomb fired body 10d shown in FIG. 3D described in the method of manufacturing a honeycomb structured body according to the first embodiment of the present invention.

The honeycomb fired body 320b and the honeycomb fired body 320c are the secondary honeycomb fired bodies, and the number of secondary honeycomb fired bodies is two. Thus, the fixing is the second positioning.

Thereafter, many first-shape units are placed in the same manner.

FIG. 10A, FIG. 10B, FIG. 10C, FIG. 10D, FIG. 10E, and FIG. 10F are diagrams schematically showing the procedure of the binding in the method of manufacturing a honeycomb structured body of the embodiment of the present invention.

Figure 10A:
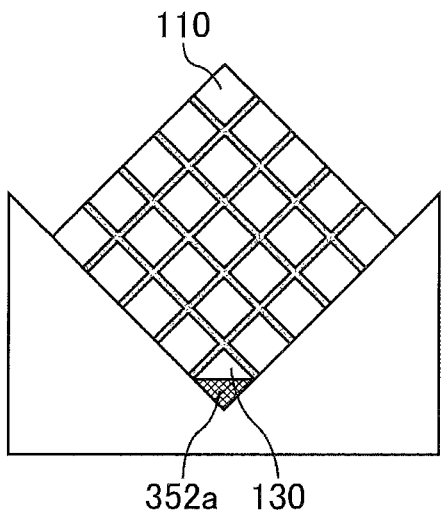
FIG. 10A, FIG. 10B, FIG. 10C, FIG. 10D, FIG. 10E, and FIG. 10F are diagrams schematically showing the procedure of the binding in the method of manufacturing a honeycomb structured body of an embodiment of the present invention.

FIG. 10A schematically shows the state after many first-shape units 110 are placed through the steps shown in FIG. 9A to FIG. 9D so that 24 first-shape units 110 and one third-shape unit 130 are placed.

Figure 10D:
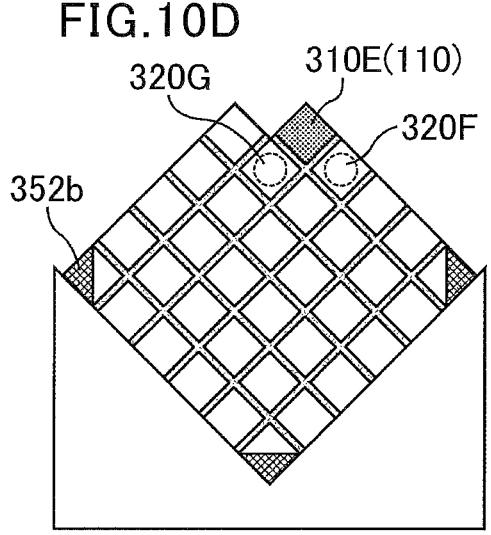
Figure 10B:
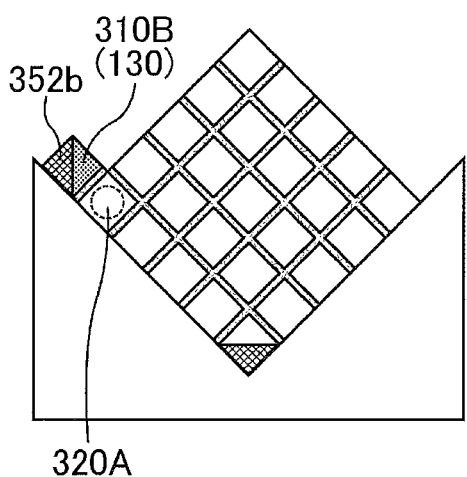

In the placing shown in FIG. 10B, a triangular jig 352b is placed on the left edge in the figure, and a honeycomb fired body 310B with adhesive material paste applied thereto is placed adjacent to the triangular jig 352b. The honeycomb fired body 310B is a third-shape unit 130 and is a primary honeycomb fired body.

In the placing of the honeycomb fired body 310B, a honeycomb fired body 320A is the only secondary honeycomb fired body, and the number of secondary honeycomb fired bodies is one. Thus, the fixing is the first positioning.

Figure 10E:
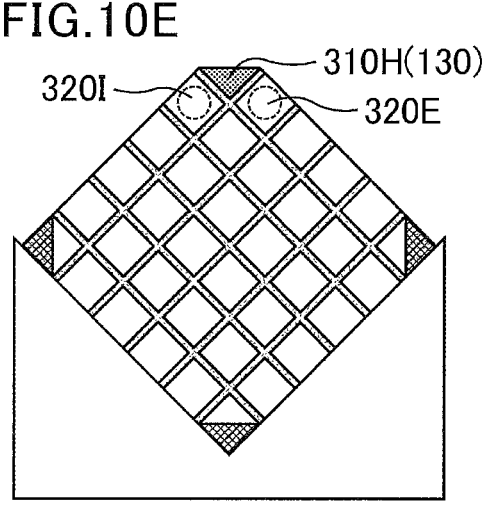
Figure 10C:
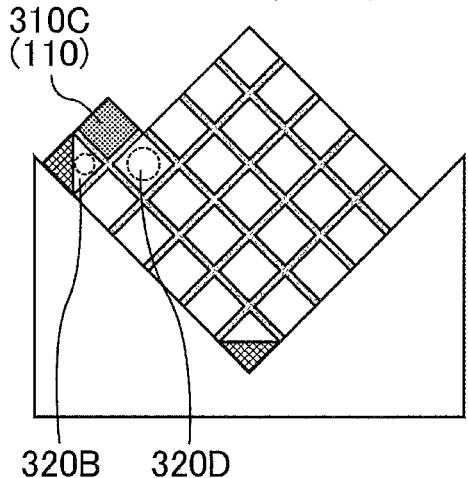

In the placing shown in FIG. 10C, a honeycomb fired body 310C with adhesive material paste applied to the side face thereof is placed so as to contact the honeycomb fired body 320B and a honeycomb fired body 320D which are the secondary honeycomb fired bodies.

The honeycomb fired body 310C is a first-shape unit 110.

In the placing of the honeycomb fired body 310C, the honeycomb fired body 320B and the honeycomb fired body 320D are the secondary honeycomb fired bodies, and the number of secondary honeycomb fired bodies is two. Thus, the fixing is the second positioning.

Thereafter, first-shape units and third-shape units are piled up in the same manner as mentioned above, thereby achieving the state shown in FIG. 10D.

FIG. 10D shows placing of a primary honeycomb fired body 310E which is a first-shape unit 110 to be placed at last among the first-shape units 110 constituting the ceramic block 303 (see FIG. 6).

In the placing of the honeycomb fired body 310E, a honeycomb fired body 320F and a honeycomb fired body 320G are the secondary honeycomb fired bodies, and the number of secondary honeycomb fired bodies is two. Thus, the fixing is the second positioning.

FIG. 10E shows placing of a primary honeycomb fired body 310H which is a third-shape unit 130 to be placed at last among the third-shape units 130 constituting the ceramic block 303.

In the placing of the honeycomb fired body 310H, a honeycomb fired body 320I and a honeycomb fired body 320E are secondary honeycomb fired bodies, and the number of secondary honeycomb fired bodies is two. Thus, the fixing is the second positioning.

Figure 10F:
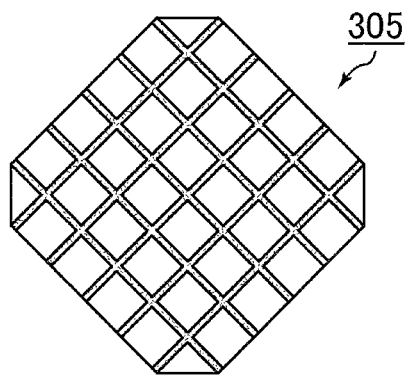

FIG. 10F shows an octagonal-pillar-shaped honeycomb aggregate 305 which is manufactured by the aforementioned steps and which includes 32 first-shape units 110 and four third-shape units 130 piled up.

Next, eight second-shape units 120 are placed on the octagonal-pillar-shaped honeycomb aggregate 305. Two exemplary modes of placing the eight second-shape units 120 will be described below.

The following will describe a first mode of placing the second-shape units.

In the first mode, two second-shape units are placed on a support, and the honeycomb aggregate 305 manufactured through the steps up to the step shown in FIG. 10F is placed on the second-shape units.

Figure 11A:
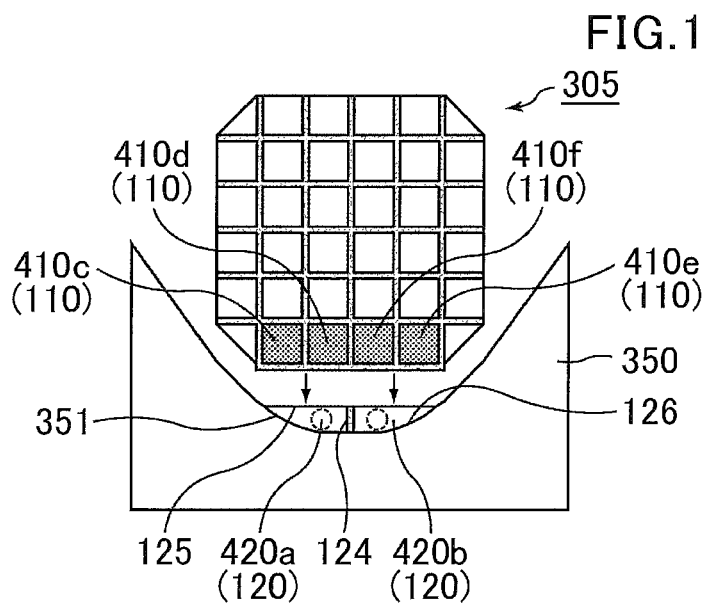
FIG. 11A, FIG. 11B, and FIG. 11C are diagrams schematically showing one example of modes of placing second-shape units in the method of manufacturing a honeycomb structured body of an embodiment of the present invention.
Figure 11B:
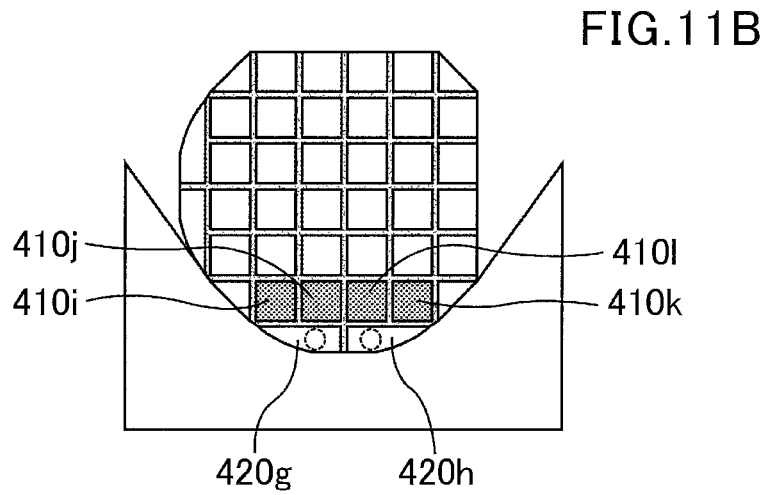
Figure 11C:
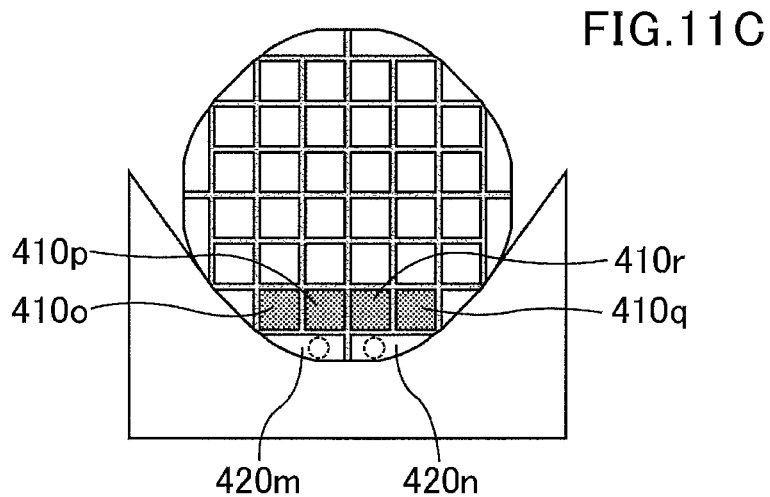

FIG. 11A, FIG. 11B, and FIG. 11C are diagrams schematically showing one example of modes of placing second-shape units in the method of manufacturing a honeycomb structured body of the embodiment of the present invention.

The first mode uses a support having a placing face of semicircular cross section.

The term "semicircular" in the embodiment of the present invention is not limited to a part of a circular arc in the strict sense, and should be understood as to include shapes having a curve similar to a circular arc. For example, the term "semicircular" includes a shape corresponding to the circular arc constituting the sloping side 126 of the second-shape unit 120 shown in FIG. 7.

FIG. 11A schematically shows the state of performing the placing on the support 350 having a placing face 351 of semicircular cross section.

In FIG. 11A, two second-shape units 120 are placed on the placing face 351 with the sloping sides 126 thereof being opposite to the placing face 351.

Adhesive material paste is applied to the side faces of honeycomb fired bodies 410c, 410d, 410e, and 410f.

The adhesive material paste is also applied between the first sides 124 of the two second-shape units 120.

On the two second-shape units 120 placed on the placing face 351 is placed the octagonal-pillar-shaped honeycomb aggregate 305 manufactured through the steps up to the step shown in FIG. 10F.

When the honeycomb aggregate 305 is placed, the two second-shape units 120 are considered as secondary honeycomb fired bodies (secondary honeycomb fired bodies 420a and 420b).

In placing the honeycomb aggregate 305, end faces of the secondary honeycomb fired bodies 420a and 420b are fixed in the fixing. Since the number of secondary honeycomb fired bodies is two, the fixing is the second positioning.

In the step shown in FIG. 11A, four honeycomb fired bodies (first-shape units 110) represented by the reference signs 410c, 410d, 410e, and 410f are primary honeycomb fired bodies.

FIG. 11B shows a step in which the honeycomb aggregate 305 is rotated by 90° and lifted, and then placed on two second-shape units 120 other than those shown in FIG. 11A.

The two second-shape units 120 are secondary honeycomb fired bodies (secondary honeycomb fired bodies 420g and 420h), and end faces thereof are to be fixed in the fixing.

Since the number of secondary honeycomb fired bodies is two, the fixing is the second positioning.

Four honeycomb fired bodies (first-shape units 110) represented by the reference signs 410i, 410j, 410k, and 410l are primary honeycomb fired bodies.

FIG. 11C shows the state after performing a step of rotating the honeycomb aggregate 305 by 90° and placing it on another two second-shape units 120 twice in the same manner as in the step shown in FIG. 11B.

The two second-shape units 120 are secondary honeycomb fired bodies (secondary honeycomb fired bodies 420m and 420n), and the end faces thereof are to be fixed in the fixing.

Since the number of secondary honeycomb fired bodies is two, the fixing is the second positioning.

Four honeycomb fired bodies (first-shape units 110) represented by the reference signs 410o, 410p, 410q, and 410r are primary honeycomb fired bodies.

The aforementioned steps lead to completion of the placing of the eight second-shape units 120.

This brings to a close the description about the first mode of placing the second-shape units.

The following will describe a second mode of placing the second-shape units.

In the second mode, the honeycomb aggregate 305 manufactured through the steps up to the step shown in FIG. 10F is placed on a support. Then, second-shape units 120 are placed on the honeycomb aggregate 305 successively.

FIG. 12A, FIG. 12B, FIG. 12C, FIG. 13A, FIG. 13B, and FIG. 13C are diagrams schematically showing another example of modes of placing second-shape units in the method of manufacturing a honeycomb structured body of the embodiment of the present invention.

The second mode uses different supports in the first and second halves of the placing of the second-shape units.

Figure 12A:
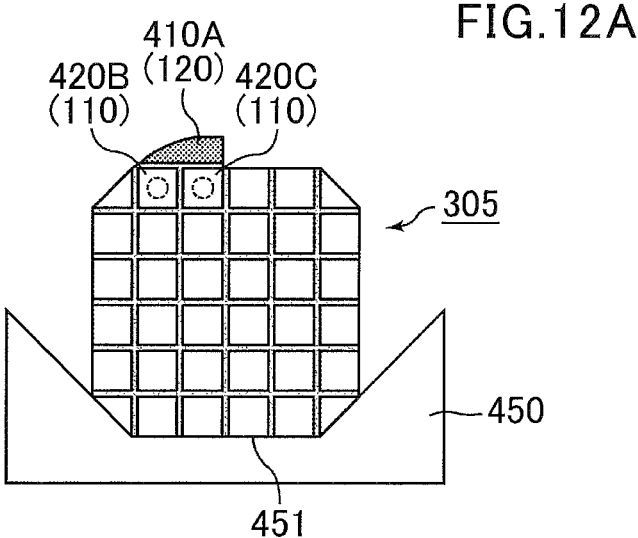
FIG. 12A, FIG. 12B, and FIG. 12C are diagrams schematically showing another example of modes of placing second-shape units in the method of manufacturing a honeycomb structured body of an embodiment of the present invention.

FIG. 12A schematically shows placing of a first second-shape unit 120 on the honeycomb aggregate 305.

The support 450 has a placing face 451 whose cross section has three straight lines and corresponds to the cross section of the octagonal-pillar-shaped honeycomb aggregate 305.

When the shape of the placing face 451 is observed not in terms of the cross section but in terms of the planes, the placing face 451 can also be considered as a combination of three planes.

In FIG. 12A, the honeycomb aggregate 305 is placed on the placing face 451, and a second-shape unit 120, that is, a primary honeycomb fired body 410A, with adhesive material paste applied thereto, is placed on two first-shape units 110.

When the primary honeycomb fired body 410A is placed, the two first-shape units 110 are secondary honeycomb fired bodies (secondary honeycomb fired bodies 420B and 420C).

In placing the primary honeycomb fired body 410A, end faces of the secondary honeycomb fired bodies 420B and 420C are fixed in the fixing. Since the number of secondary honeycomb fired bodies is two, the fixing is the second positioning.

Figure 12B:
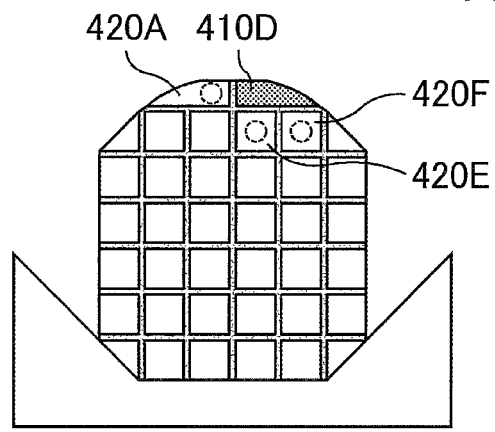

FIG. 12B schematically shows placing of a primary honeycomb fired body 410D, which is a second second-shape unit 120, following the step shown in FIG. 12A.

In the placing of the primary honeycomb fired body 410D, the honeycomb fired bodies placed at the positions where side faces thereof are opposite to a side face of the primary honeycomb fired body 410D are a honeycomb fired body 420A, a honeycomb fired body 420E, and a honeycomb fired body 420F. Thus, these three honeycomb fired bodies are secondary honeycomb fired bodies.

In placing the primary honeycomb fired body 410D, end faces of the secondary honeycomb fired bodies 420A, 420E, and 420F are fixed in the fixing. Since the number of secondary honeycomb fired bodies is three, the fixing is the second positioning.

Figure 12C:
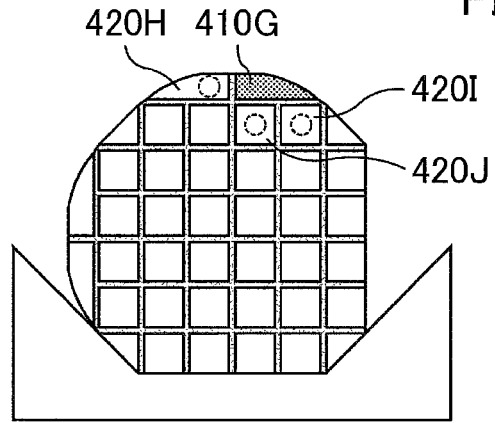

FIG. 12C schematically shows placing of a primary honeycomb fired body 410G, which is a fourth second-shape unit 120, on the honeycomb aggregate 305.

In the placing of the primary honeycomb fired body 410G, the secondary honeycomb fired bodies are defined in the same manner as in the step shown in FIG. 12B. In other words, a honeycomb fired body 420H, a honeycomb fired body 420I, and a honeycomb fired body 420J are the secondary honeycomb fired bodies.

In placing the primary honeycomb fired body 410G, end faces of the secondary honeycomb fired bodies 420H, 420I, and 420J are fixed in the fixing. Since the number of secondary honeycomb fired bodies is three, the fixing is the second positioning.

Figure 13A:
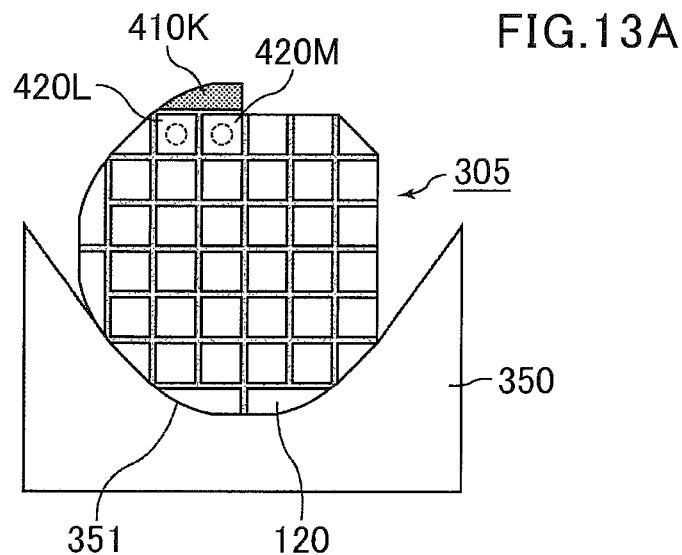
FIG. 13A, FIG. 13B, and FIG. 13C are diagrams schematically showing still another example of modes of placing second-shape units in the method of manufacturing a honeycomb structured body of an embodiment of the present invention.

FIG. 13A schematically shows placing of a primary honeycomb fired body 410K, which is a fifth second-shape unit 120, on the honeycomb aggregate 305.

From this step, a support 350 having a placing face 351 of semicircular cross section is used; this is the same support as that used in the first mode.

Then, the honeycomb aggregate 305 is placed on the support 350 with the previously placed second-shape units 120 being downward.

In FIG. 13A, a second-shape unit 120 with adhesive material paste applied thereto, that is, a primary honeycomb fired body 410K, is placed on two first-shape units 110 existing at the upper face of the honeycomb aggregate 305 placed on the placing face 351.

In placing the primary honeycomb fired body 410K, the two first-shape units 110 are secondary honeycomb fired bodies (secondary honeycomb fired bodies 420L and 420M).

In placing the primary honeycomb fired body 410K, end faces of the secondary honeycomb fired bodies 420L and 420M are fixed in the fixing. Since the number of secondary honeycomb fired bodies is two, the fixing is the second positioning.

Figure 13B:
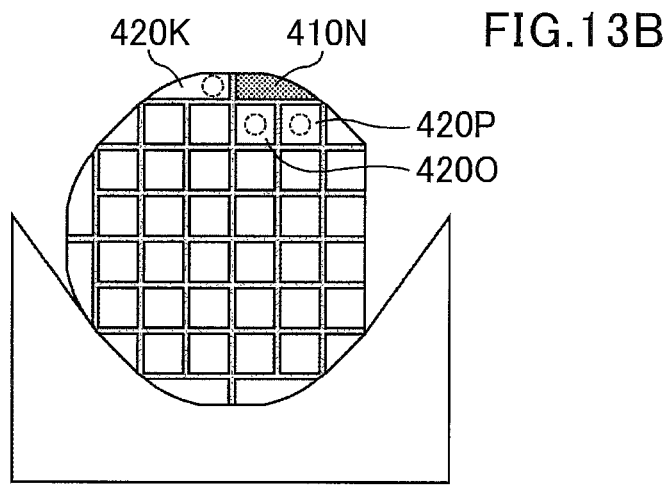

FIG. 13B schematically shows placing of a primary honeycomb fired body 410N, which is a sixth second-shape unit 120, on the honeycomb aggregate 305 following the step shown in FIG. 13A.

In the placing of the primary honeycomb fired body 410N, a honeycomb fired body 420K, a honeycomb fired body 420P, and a honeycomb fired body 420O are secondary honeycomb fired bodies.

In placing the primary honeycomb fired body 410N, end faces of the secondary honeycomb fired bodies 420K, 420P, and 420O are fixed in the fixing. Since the number of secondary honeycomb fired bodies is three, the fixing is the second positioning.

Figure 13C:
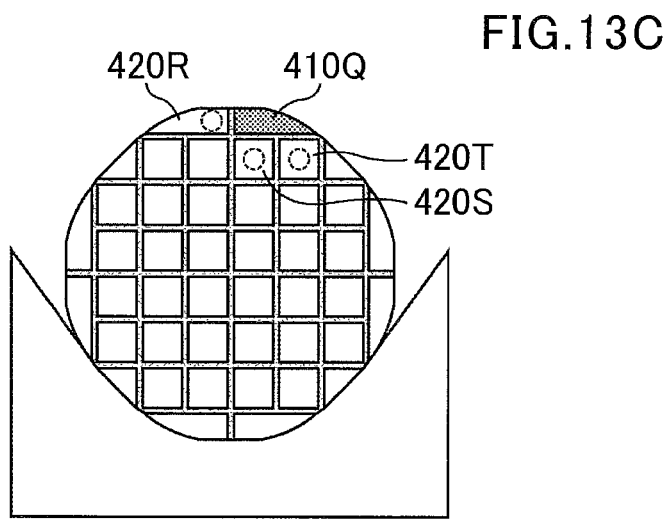

FIG. 13C schematically shows placing of a primary honeycomb fired body 410Q, which is an eighth second-shape unit 120, on the honeycomb aggregate 305.

In the placing of the primary honeycomb fired body 410Q, a honeycomb fired body 420R, a honeycomb fired body 420S, and a honeycomb fired body 420T are secondary honeycomb fired bodies.

In placing the primary honeycomb fired body 410Q, end faces of the secondary honeycomb fired bodies 420R, 420S, and 420T are fixed in the fixing. Since the number of secondary honeycomb fired bodies is three, the fixing is the second positioning.

The aforementioned steps lead to completion of the placing of the eight second-shape units 120.

This brings to a close the description about the second mode of placing the second-shape units.

Piling up of all the honeycomb fired bodies is completed through the aforementioned steps, in other words, the binding is completed.

Figure 14:
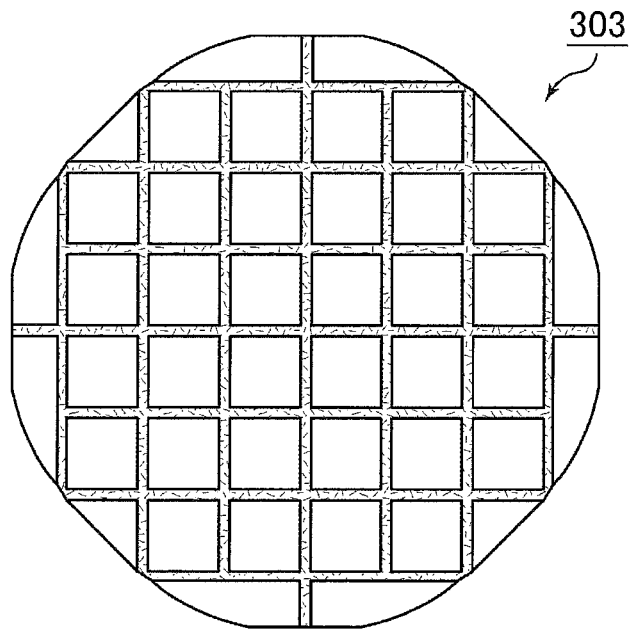
FIG. 14 is a side view schematically showing a ceramic block constituting the honeycomb structured body manufactured by the method of manufacturing a honeycomb structured body of an embodiment of the present invention.

Next, the adhesive material paste is heat-solidified into adhesive layers in the same manner as described in the method of manufacturing a honeycomb structured body according to the first embodiment of the present invention, thereby providing a ceramic block 303 (see FIG. 14).

FIG. 14 is a side view schematically showing a ceramic block constituting the honeycomb structured body manufactured by the method of manufacturing a honeycomb structured body of the embodiment of the present invention.

Next, forming of a coat layer is performed in which coat material paste is applied to the peripheral face of the ceramic block and then dry-solidified to be a coat layer, thereby providing a round-pillar-shaped honeycomb structured body 300 shown in FIG. 6.

The ceramic block manufactured in the present embodiment already has substantially a round pillar shape. Thus, it can be used as a round-pillar-shaped honeycomb structured body without cutting.

The method of manufacturing a honeycomb structured body according to the present embodiment is different from the method of manufacturing a honeycomb structured body according to the first embodiment of the present invention in that a ceramic block is formed in a different manner and the ceramic block of the present embodiment requires no cutting.

The other steps are the same as those in the method of manufacturing a honeycomb structured body according to the first embodiment of the present invention. Thus, the description about the other steps is omitted here.

In the second positioning, the positions of the first end faces of secondary honeycomb fired bodies may be fixed using a plate-like member in the same manner as in the method of manufacturing a honeycomb structured body according to the second embodiment of the present invention.

The method of manufacturing a honeycomb structured body according to the third embodiment of the present invention exerts not only the effects (1) to (6) described in the first embodiment and the second embodiment of the present invention but also the following effect.

(7) In the method of manufacturing a honeycomb structured body according to the present embodiment, the ceramic block includes 36 or more honeycomb fired bodies bound to each other.

Thus, even a large honeycomb structured body including a ceramic block formed from 36 or more honeycomb fired bodies bound together is less likely to suffer from the following problems:

(a) large displacement of honeycomb fired bodies along the longitudinal direction;

(b) poor flatness of an end face of the honeycomb structured body;

(c) low bonding strength between the honeycomb fired bodies constituting the honeycomb structured body; and (d) uneven thickness of an adhesive layer between the honeycomb fired bodies constituting the honeycomb structured body.

Therefore, a honeycomb structured body manufactured by the method of manufacturing a honeycomb structured body of the present embodiment raises no breakage of honeycomb fired bodies sticking out in the longitudinal direction during, for example, delivery of a honeycomb structured body to the exhaust pipe of automobiles. Further, it has no reduction in bonding strength at a thin portion of the adhesive layer.

Fourth Embodiment

The following will describe a fourth embodiment, which is one embodiment of the present invention.

The method of manufacturing a honeycomb structured body according to the present embodiment is different from the method of manufacturing a honeycomb structured body according to the first embodiment of the present invention in that the shape of a ceramic block manufactured using a unit of quadrangular cross section is not a quadrangular pillar shape.

Figure 15:
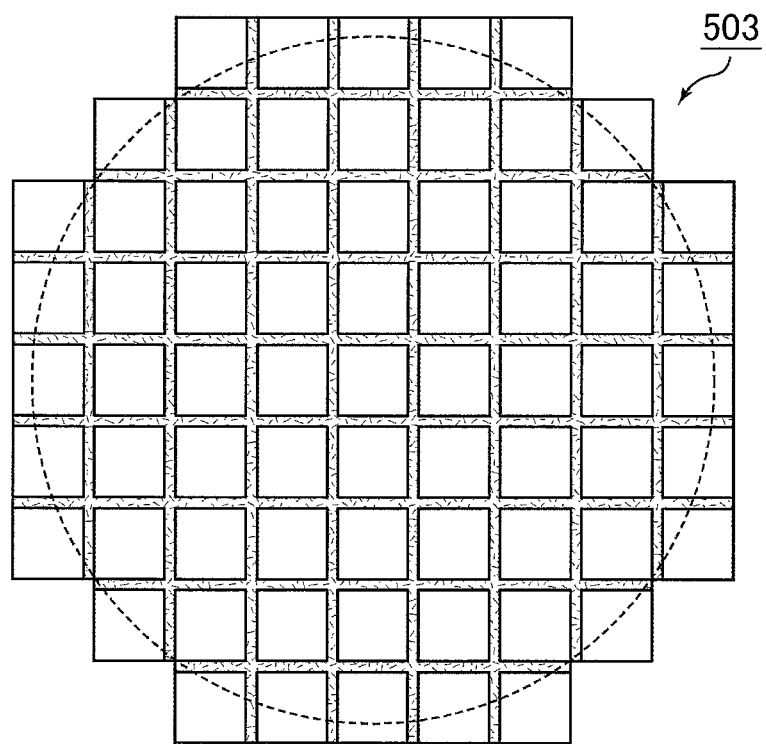
FIG. 15 is a side view schematically showing a ceramic block constituting the honeycomb structured body manufactured by the method of manufacturing a honeycomb structured body of an embodiment of the present invention.

FIG. 15 is a side view schematically showing a ceramic block constituting the honeycomb structured body manufactured by the method of manufacturing a honeycomb structured body of the embodiment of the present invention.

A ceramic block 503 shown in FIG. 15 includes 69 units of quadrangular cross section bound together, and can be formed into a round-pillar-shaped ceramic block by cutting the periphery of the ceramic block along the dotted line.

The following will describe the binding for manufacturing the ceramic block 503 shown in FIG. 15.

Figure 16A:
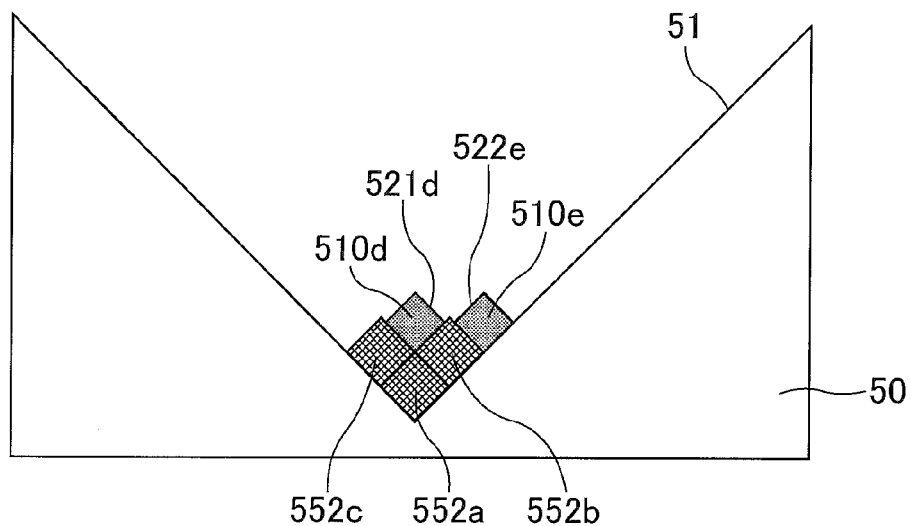
FIG. 16A, FIG. 16B, and FIG. 16C are diagrams schematically showing the procedure of the binding in the method of manufacturing a honeycomb structured body of an embodiment of the present invention.
Figure 16B:
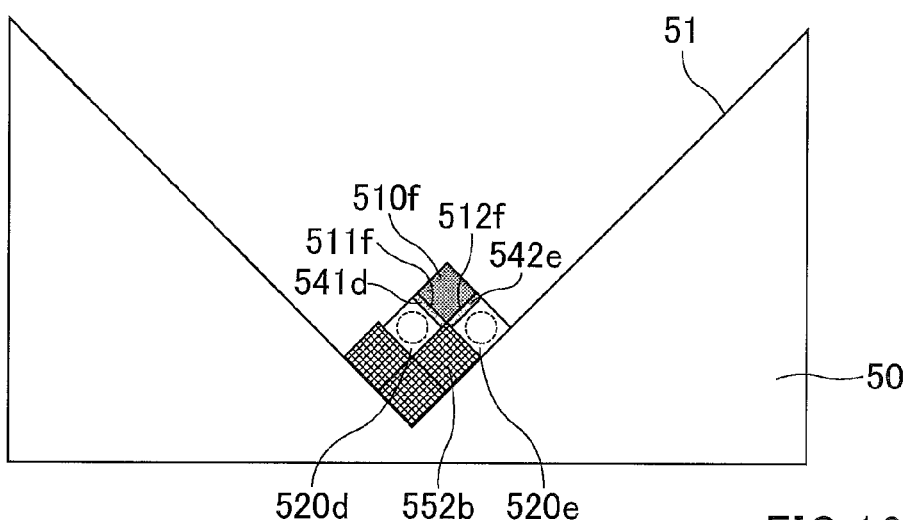
Figure 16C:
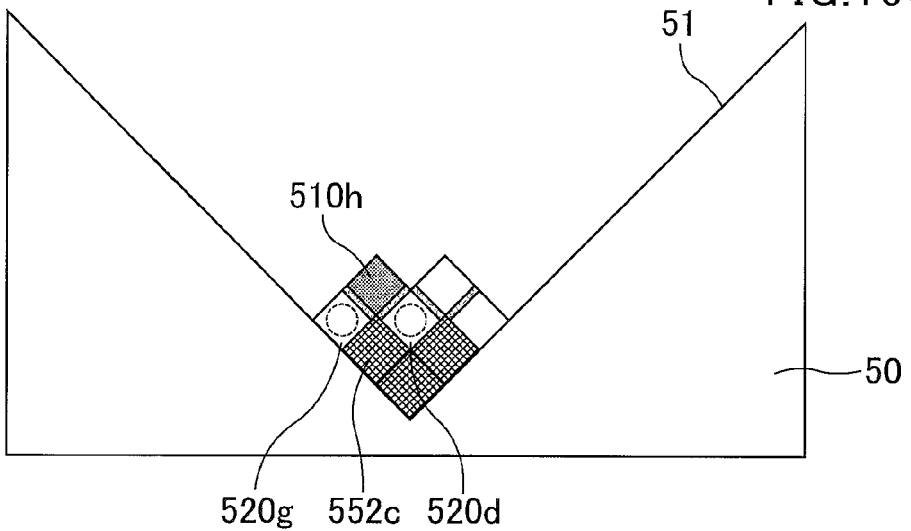

FIG. 16A, FIG. 16B, and FIG. 16C are diagrams schematically showing the procedure of the binding in the method of manufacturing a honeycomb structured body of the embodiment of the present invention.

In the example shown here, a support 50 is one having a placing face of V-shaped cross section (the angle of the V shape is 90°), which is the same as one used in the binding in the method of manufacturing a honeycomb structured body according to the first embodiment of the present invention.

On a placing face 51 of the support 50 are placed quadrangular-pillar-shaped quadrangular jigs 552a, 552b, and 552c (FIG. 16A). The quadrangular jigs 552a, 552b, and 552c each have a shape substantially the same as the outer shape of the first-shape unit 110 shown in FIG. 2, but are greater than that by the thickness of an adhesive layer to be formed later. The quadrangular jigs have no cells.

As shown in FIG. 16A, honeycomb fired bodies 510d and 510e are placed.

Then, the position opposite to the upper right side face 521d of the honeycomb fired body 510d and opposite to the upper left side face 522e of the honeycomb fired body 510e is determined as the placing position for placing a next honeycomb fired body.

As shown in FIG. 16B, a honeycomb fired body 510f with adhesive material pastes 541d and 542e being applied to side faces 511f and 512f thereof is placed on the side face 521d and the side face 522e, in other words, placed on the placing position.

In FIG. 16B, the honeycomb fired body 510f is a first-shape unit 110 and is a primary honeycomb fired body to be placed.

In the placing shown in FIG. 16B, the honeycomb fired body 520d and the honeycomb fired body 520e are secondary honeycomb fired bodies, and are honeycomb fired bodies whose end faces are fixed in the fixing.

Since the number of secondary honeycomb fired bodies is two, the fixing is the second positioning.

In the placing shown in FIG. 16C, a honeycomb fired body 520g adjacent to a quadrangular jig 552c is placed, and then a honeycomb fired body 510h is placed.

In the placing shown in FIG. 16C, the honeycomb fired body 510h is a primary honeycomb fired body.

The honeycomb fired body 520d and the honeycomb fired body 520g are secondary honeycomb fired bodies, and are honeycomb fired bodies whose end faces are fixed in the fixing.

Since the number of secondary honeycomb fired bodies is two, the fixing is the second positioning.

Figure 17A:
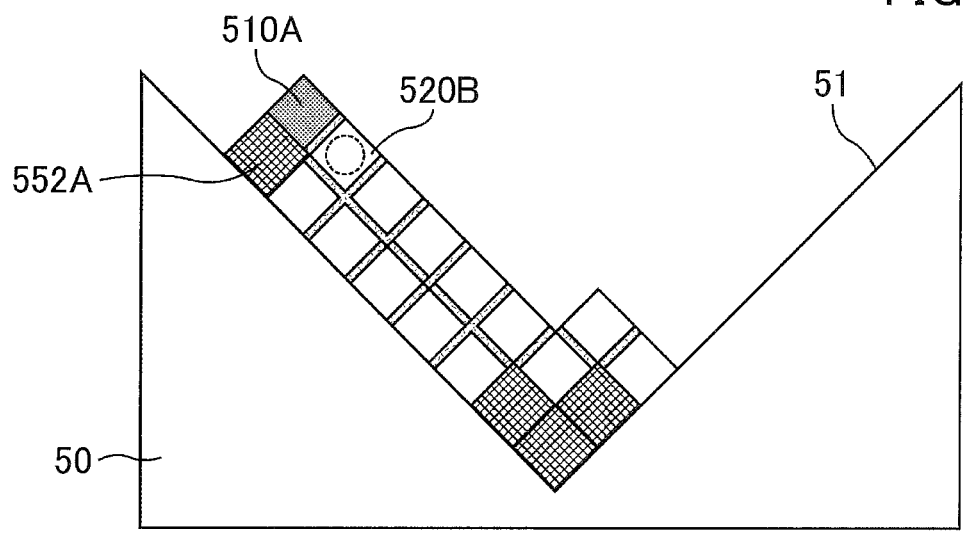
FIG. 17A and FIG. 17B are diagrams schematically showing the procedure of the binding in the method of manufacturing a honeycomb structured body of an embodiment of the present invention.
Figure 17B:
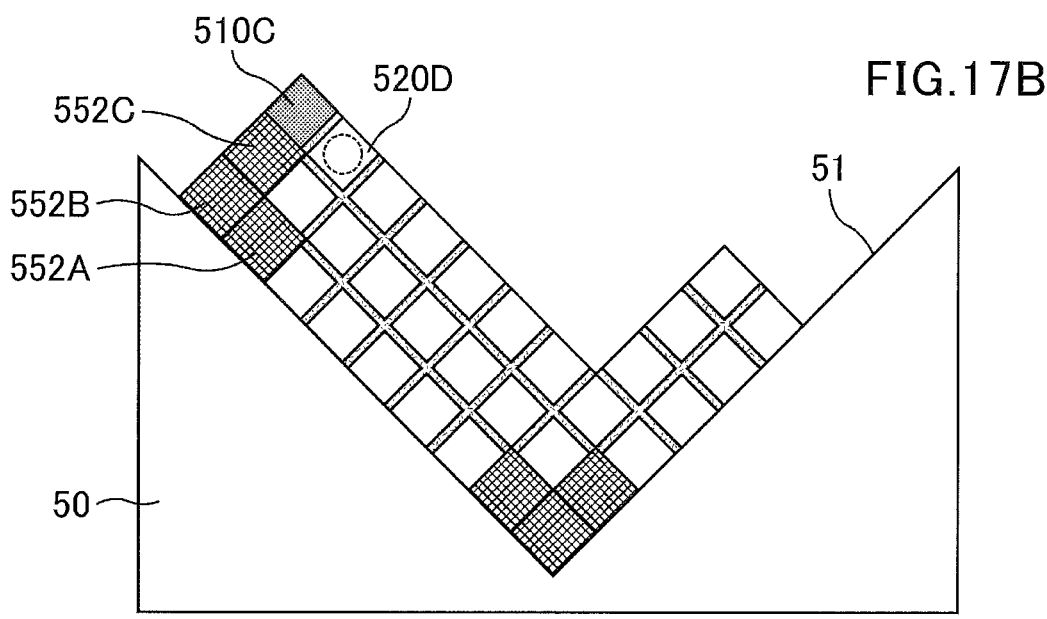

FIG. 17A and FIG. 17B are diagrams schematically showing the procedure of the binding in the method of manufacturing a honeycomb structured body of the embodiment of the present invention.

FIG. 17A schematically shows the state where many first-shape units are placed after the steps up to the step shown in FIG. 16C.

FIG. 17A shows one example of placing a honeycomb fired body 510A using a quadrangular jig 552A.

The quadrangular jig 552A is placed on a placing support 50, and a honeycomb fired body 510A with adhesive material paste applied thereto is placed adjacent to the quadrangular jig 552A.

In the placing of the honeycomb fired body 510A, the honeycomb fired body 520B is the only secondary honeycomb fired body, and the number of secondary honeycomb fired bodies is one. Thus, the fixing is the first positioning.

FIG. 17B shows one example of placing a honeycomb fired body 510C further using quadrangular jigs 552B and 552C.

In the placing of the honeycomb fired body 510C, a honeycomb fired body 520D is the only secondary honeycomb fired body, and the number of secondary honeycomb fired bodies is one. Thus, the fixing is the first positioning.

Thereafter, first-shape units are placed in the same manner as mentioned above and all the honeycomb fired bodies are piled up, thereby completing the binding. Then, the adhesive material paste is heat-solidified to be adhesive layers, thereby providing a ceramic block 503 in the same manner as in the method of manufacturing a honeycomb structured body according to the first embodiment of the present invention (see FIG. 15).

The method of manufacturing a honeycomb structured body according to the fourth embodiment of the present invention exerts not only the effects (1) to (7) described in the first embodiment to third embodiment of the present invention but also the following effect.

(8) A ceramic block manufactured by the method of manufacturing a honeycomb structured body according to the present embodiment has less waste portions to be cut when it is cut into a round-pillar shape, and thus reduces the amount of wasteful material in comparison with the case of manufacturing a quadrangular-pillar-shaped ceramic block for providing the same round-pillar-shaped ceramic block. The example shown in FIG. 15 includes 69 honeycomb fired bodies, whereas a quadrangular-pillar-shaped ceramic block includes 81 honeycomb fired bodies.

OTHER EMBODIMENTS

The binding apparatus used in the fixing of the method of manufacturing a honeycomb structured body according to each embodiment of the present invention is not limited to those described in the first embodiment and the second embodiment of the present invention, and may be one having the following structure.

The end-face-pressing member is not limited to a round pillar shape. For example, it may have the same shape as the end face of a target honeycomb fired body, or may have a shape similar to the end face of the honeycomb fired body.

The end-face-pressing member and the end-face-pressurizing means may have any relationship, and for example, one end-face-pressurizing means corresponds to one end-face-pressing member so that driving of one end-face-pressurizing means moves one corresponding end-face-pressing member. Alternatively, one end-face-pressurizing means may correspond to multiple end-face-pressing members so that driving of one end-face-pressurizing means simultaneously moves multiple end-face-pressing members.

With the honeycomb fired bodies described in the first embodiment and the second embodiment of the present invention, a pressure applied by the end-face-pressing member to the end face of each honeycomb fired body is preferably 0.3 to 2.5 MPa.

The binding apparatus may exclude a vibrating means and a downwardly pressurizing means. With a binding apparatus having neither a vibrating means nor a downwardly pressurizing means, in other words, in the case of performing no pressing and vibrating, adhesive material paste is preferably evenly spread on the side face of the honeycomb fired body before the placing.

The size of the support shown in FIG. 4 in the direction parallel with the longitudinal direction of the honeycomb fired body is shorter than the length of the honeycomb fired body in the longitudinal direction, so that both ends of the honeycomb fired body protrude from the support.

The support to be used in the method of manufacturing a honeycomb structured body according to the embodiments of the present invention is not limited to one having such a size, and it may have a size such that neither ends of the honeycomb fired body protrude from the support.

With a support having such a size, the position-standardizing member is preferably not a plate-like member but a pillar-shaped member. The position-standardizing members and the end-face-pressing members formed from pillar-shaped members can fix the end faces of secondary honeycomb fired bodies.

The honeycomb structured body manufactured by the method of manufacturing a honeycomb structured body according to any embodiment of the present invention may have any cross-sectional shape other than a circular shape in the direction perpendicular to the longitudinal direction, and may have an ellipse shape, a racetrack shape, or a triangular shape with curved apexes.

For the honeycomb structured body manufactured by the method of manufacturing a honeycomb structured body according to any embodiment of the present invention, no plug may be formed in cells and thus the cell ends may not be sealed. In this case, the honeycomb structured body is to support a catalyst on the cell walls thereof to serve as a catalyst support for converting toxic gas components contained in exhaust gas, such as CO, HC, and NOx.

In the method of manufacturing a honeycomb structured body according to any embodiment of the present invention, the peripheral wall of the honeycomb fired body is not necessarily thicker than the cell wall thereof, and the peripheral wall and the cell wall may have the same thickness.

For the honeycomb fired bodies constituting the honeycomb structured body manufactured by the method of manufacturing a honeycomb structured body according to any embodiment of the present invention, the main material thereof is not limited to silicon carbide or silicon-bond silicon carbide. Examples of other ceramic materials include nitride ceramics such as aluminum nitride, silicon nitride, boron nitride, and titanium nitride; carbide ceramics such as zirconium carbide, titanium carbide, tantalum carbide, and tungsten carbide; and oxide ceramics such as cordierite and aluminum titanate.

Preferable are non-oxide ceramics, and particularly preferable is silicon carbide or silicon-bond silicon carbide. This is because such ceramics are excellent in properties such as heat resistance, mechanical strength, and thermal conductivity.

Examples of the inorganic binder contained in the adhesive material paste and the coat material paste include silica sol and alumina sol. These may be used alone or in combination. Preferable as an inorganic binder is silica sol.

Examples of the organic binder contained in the adhesive material paste and the coat material paste used in the method of manufacturing a honeycomb structured body according to any embodiment of the present invention include polyvinyl alcohol, methyl cellulose, ethyl cellulose, and carboxymethyl cellulose. These may be used alone or in combination. Preferable as an organic binder is carboxymethyl cellulose.

Examples of the inorganic particles contained in the adhesive material paste and the coat material paste include carbide particles and nitride particles. Specific examples thereof include silicon carbide particles, silicon nitride particles, and boron nitride particles. These may be used alone or in combination. Preferable as the inorganic particles are silicon carbide particles, which are excellent in heat conductivity.

Examples of at least one of the inorganic fibers and whiskers contained in the adhesive material paste and the coat material paste include at least one of inorganic fibers and whiskers formed from any of silica-alumina, mullite, alumina, and silica. These may be used alone or in combination. Preferable as the inorganic fibers are alumina fibers. The inorganic fibers may be biosoluble fibers.

The adhesive material paste and the coat material paste may optionally further contain balloons which are fine hollow spheres containing oxide ceramic or pore-forming agents such as spherical acrylic particles and graphite. Any balloons may be used, and examples thereof include alumina balloons, glass micro balloons, shirasu balloons, fly ash balloons (FA balloons), and mullite balloons. Preferable are alumina balloons.

The method of manufacturing a honeycomb structured body of the embodiment of the present invention essentially includes fixing of the position of an end face of a secondary honeycomb fired body, which is a honeycomb fired body placed on the position where a side face thereof is opposite to a side face of the primary honeycomb fired body below the placing position for placing the primary honeycomb fired body.

Combination of the above essential step with any other structures (e.g. the cross-sectional shape of a honeycomb structured body, the composition of adhesive material paste) described in the first embodiment to fourth embodiment, and other embodiments of the present invention can provide desired effects.

Obviously, numerous modifications and variations of the present invention are possible in light of the above teachings. It is therefore to be understood that within the scope of the appended claims, the invention may be practiced otherwise than as specifically described herein.

The invention claimed is:

1. A method of manufacturing a honeycomb structured body, comprising:

forming a ceramic block by binding multiple pillar-shaped honeycomb fired bodies with adhesive layers interposed therebetween, the multiple pillar-shaped honeycomb fired bodies each having cells longitudinally disposed in parallel with each other and cell walls between the cells, each cell wall of the multiple pillar-shaped honeycomb fired bodies having a thickness of about 0.1 mm to about 0.2 mm and each peripheral wall of the multiple pillar-shaped honeycomb fired bodies having a thickness of about 0.25 mm to about 0.5 mm, the forming the ceramic block comprising:

binding the multiple pillar-shaped honeycomb fired bodies on a support by piling up the multiple pillar-shaped honeycomb fired bodies successively, the binding comprising:

determining a placing position where a primary honeycomb fired body is to be placed;

fixing a position of an end face of at least one secondary honeycomb fired body by applying force to the end face of the at least one secondary honeycomb fired body, the at least one secondary honeycomb fired body being a honeycomb fired body whose side face is to be opposite to a side face of the primary honeycomb fired body below the placing position;

placing the primary honeycomb fired body on the placing position with the position of the end face of the at least one secondary honeycomb fired body being fixed; and the fixing further comprising:

first positioning or second positioning based on a number of the at least one secondary honeycomb fired body before the fixing, the at least one secondary honeycomb fired body each being placed on a position where a side face of the at least one secondary honeycomb fired body is opposite to a side face of the primary honeycomb fired body to be placed; and when the at least one secondary honeycomb fired body includes one secondary honeycomb fired body, the first positioning being performed to fix a position of an end face of only the single secondary honeycomb fired body, or when the at least one secondary honeycomb fired body includes multiple secondary honeycomb fired bodies, the second positioning being performed to fix positions of first end faces of only the multiple secondary honeycomb fired bodies so as to align the positions of the first end faces of the multiple secondary honeycomb fired bodies.

2. The method according to claim 1, wherein in the second positioning, the positions of the first end faces of the multiple secondary honeycomb fired bodies are fixed using a plate-shaped member.

3. The method according to claim 1, further comprising, after the fixing, pressing and vibrating in which the primary honeycomb fired body is pressed downwardly and vibration is applied to the primary honeycomb fired body.

4. The method according to claim 1,
wherein
the ceramic block comprises 36 or more honeycomb fired bodies bound to one another.

5. The method according to claim 1,
wherein
the support has a placing face for placing honeycomb fired bodies, and the placing face has a V-shaped cross section perpendicular to a longitudinal direction of the honeycomb fired bodies.

6. The method according to claim 1,
wherein
the support has a placing face for placing honeycomb fired bodies, and the placing face has a semicircular-shaped cross section perpendicular to a longitudinal direction of the honeycomb fired bodies.

7. The method according to claim 1,
wherein
the ceramic block has a quadrangular-pillar shape, and the method further comprises cutting a periphery of the ceramic block.

8. The method according to claim 7, further comprising
forming a coat layer on the periphery of the ceramic block which is cut.

9. The method according to claim 1,
wherein
the honeycomb structured body has a cross section perpendicular to a longitudinal direction thereof, and the cross section has a circular shape, an elliptical shape, a racetrack shape, or a triangular shape with rounded apices.

10. The method according to claim 9,
wherein
a diameter of the cross section perpendicular to the longitudinal direction of the honeycomb structured body has a length of about 190 mm or longer, or
a shortest segment among segments each of which passes a center of the cross section perpendicular to the longitudinal direction of the honeycomb structured body and connects two points on a circumference of the cross section has a length of about 190 mm or longer.

11. The method according to claim 2, further comprising, after the fixing,
pressing and vibrating in which the primary honeycomb fired body is pressed downwardly and vibration is applied to the primary honeycomb fired body.

12. The method according to claim 2,
wherein
the ceramic block comprises 36 or more honeycomb fired bodies bound to one another.

13. The method according to claim 3,
wherein
the ceramic block comprises 36 or more honeycomb fired bodies bound to one another.

14. The method according to claim 2,
wherein
the support has a placing face for placing honeycomb fired bodies, and the placing face has a V-shaped cross section perpendicular to a longitudinal direction of the honeycomb fired bodies.

15. The method according to claim 3,
wherein
the support has a placing face for placing honeycomb fired bodies, and the placing face has a V-shaped cross section perpendicular to a longitudinal direction of the honeycomb fired bodies.

16. The method according to claim 4,
wherein
the support has a placing face for placing honeycomb fired bodies, and the placing face has a V-shaped cross section perpendicular to a longitudinal direction of the honeycomb fired bodies.

17. The method according to claim 2,
wherein
the support has a placing face for placing honeycomb fired bodies, and the placing face has a semicircular-shaped cross section perpendicular to a longitudinal direction of the honeycomb fired bodies.

18. The method according to claim 3,
wherein
the support has a placing face for placing honeycomb fired bodies, and the placing face has a semicircular-shaped cross section perpendicular to a longitudinal direction of the honeycomb fired bodies.

19. The method according to claim 4,
wherein
the support has a placing face for placing honeycomb fired bodies, and the placing face has a semicircular-shaped cross section perpendicular to a longitudinal direction of the honeycomb fired bodies.

20. The method according to claim 2,
wherein
the ceramic block has a quadrangular-pillar shape, and the method further comprises cutting a periphery of the ceramic block.

* * * * *